(12) United States Patent
Seidel et al.

(10) Patent No.: US 7,787,426 B2
(45) Date of Patent: Aug. 31, 2010

(54) ADAPTIVE CONTROL CHANNEL INITIALIZATION OPERATIONS FOR AUTONOMOUS DYNAMIC SPECTRUM ACCESS SYSTEMS

(75) Inventors: Scott Y. Seidel, Fairfax, VA (US); Jay N. Livingston, Oakton, VA (US); Michael R. Franceschini, Centerport, NY (US)

(73) Assignee: Powerwave Cognition, Inc., Santa Ana, CA (US)

( * ) Notice: Subject to any disclaimer, the term of this patent is extended or adjusted under 35 U.S.C. 154(b) by 826 days.

(21) Appl. No.: 11/595,740

(22) Filed: Nov. 10, 2006

(65) Prior Publication Data

US 2008/0112426 A1    May 15, 2008

(51) Int. Cl.
H04W 4/00     (2009.01)
H04J 3/06     (2006.01)
H04J 3/16     (2006.01)
H04L 12/28    (2006.01)

(52) U.S. Cl. .................. 370/338; 370/341; 370/350; 370/431; 370/437

(58) Field of Classification Search ............. 455/41.2, 455/62, 67.11, 418–421, 422.1, 423–425, 455/434, 445, 450, 456.1–456.6, 463, 466, 455/500, 509, 511–514, 517–519, 521–522, 455/524–525, 550.1, 556.2, 557, 561, 161.1, 455/166.2, 410–411, 435.3, 453, 452.2; 370/328–330, 370/338, 341, 453–455, 457, 465, 270, 310, 370/348, 350, 395.32, 395.4, 395.42, 400, 370/408, 430–433, 436–437, 442–444, 462; 380/30, 247, 249–250, 270, 272–273, 278, 380/283–285; 342/385–386; 713/1–2, 100; 710/10, 242; 709/207, 243; 711/216
See application file for complete search history.

(56) References Cited

U.S. PATENT DOCUMENTS

| 6,084,919 | A | 7/2000 | Kleider et al. |
| 6,385,434 | B1* | 5/2002 | Chuprun et al. ............ 455/11.1 |
| 2002/0012337 | A1 | 1/2002 | Schmidl et al. |
| 2003/0050012 | A1 | 3/2003 | Black et al. |
| 2003/0203721 | A1 | 10/2003 | Berezdivin et al. |
| 2003/0203735 | A1 | 10/2003 | Andrus et al. |
| 2003/0206561 | A1 | 11/2003 | Schmidl et al. |

(Continued)

FOREIGN PATENT DOCUMENTS

EP    1178625    2/2002

(Continued)

OTHER PUBLICATIONS

Seidel, Scott, "IEEE 802 Tutorial: Cognitive Radio", 21 pages, Jul. 18, 2005.

(Continued)

*Primary Examiner*—Meless N Zewdu
(74) *Attorney, Agent, or Firm*—Strategic Patents, PC

(57) ABSTRACT

Establishing communications between a plurality of nodes includes determining a set of frequencies to search for neighbor nodes, and performing an adaptive control channel initialization operation to detect zero or more neighbor nodes. If one or neighbor nodes are detected, an adaptive control channel with one or more of the one or more detected neighbor nodes is established.

18 Claims, 16 Drawing Sheets

U.S. PATENT DOCUMENTS

| | | |
|---|---|---|
| 2003/0210680 A1 | 11/2003 | Rao et al. |
| 2004/0047324 A1 | 3/2004 | Diener |
| 2004/0085912 A1* | 5/2004 | Xu et al. .................... 370/254 |
| 2004/0132496 A1 | 7/2004 | Kim et al. |
| 2004/0220995 A1* | 11/2004 | Tsutsumi .................... 709/200 |
| 2004/0259503 A1* | 12/2004 | Ogura .................... 455/67.11 |
| 2005/0020293 A1* | 1/2005 | Moore .................... 455/515 |
| 2005/0053032 A1 | 3/2005 | Itoh |
| 2005/0070294 A1 | 3/2005 | Lyle et al. |
| 2005/0083876 A1 | 4/2005 | Vialen et al. |
| 2005/0128998 A1 | 6/2005 | Jelitto et al. |
| 2005/0157678 A1 | 7/2005 | Mantha et al. |
| 2005/0197118 A1* | 9/2005 | Mitchell .................... 455/434 |
| 2005/0259724 A1 | 11/2005 | Bergstrom et al. |
| 2006/0035641 A1 | 2/2006 | Moon et al. |
| 2006/0126847 A1* | 6/2006 | Ho .................... 380/277 |
| 2006/0142033 A1 | 6/2006 | Wolman et al. |
| 2006/0146745 A1 | 7/2006 | Cai et al. |
| 2006/0171332 A1 | 8/2006 | Barnum |
| 2006/0215605 A1 | 9/2006 | Srikrishna et al. |
| 2006/0215611 A1 | 9/2006 | Nakagawa et al. |
| 2006/0268791 A1* | 11/2006 | Cheng et al. .................... 370/338 |
| 2006/0268792 A1 | 11/2006 | Belcea |
| 2006/0289650 A1 | 12/2006 | Taylor et al. |
| 2007/0129011 A1 | 6/2007 | Lal et al. |
| 2007/0142067 A1 | 6/2007 | Cheng et al. |
| 2007/0237092 A1* | 10/2007 | Balachandran et al. ...... 370/254 |
| 2008/0095102 A1 | 4/2008 | Meng et al. |
| 2008/0108358 A1 | 5/2008 | Patel et al. |
| 2009/0298442 A1 | 12/2009 | Adkins |

FOREIGN PATENT DOCUMENTS

| | | | |
|---|---|---|---|
| EP | 1178625 | A2 | 2/2002 |
| JP | 2003046595 | | 2/2003 |
| JP | 2003046595 | A2 | 2/2003 |
| WO | WO-9939472 | A1 | 8/1999 |
| WO | WO-2006/039800 | A1 | 4/2006 |
| WO | WO-2008/121161 | | 10/2008 |
| WO | WO-2008/127420 | | 10/2008 |
| WO | WO-2008/127421 | | 10/2008 |
| WO | WO-2008/140566 | A2 | 11/2008 |
| WO | WO-2008/140566 | A3 | 11/2008 |
| WO | WO-2008/140566 | A9 | 11/2008 |
| WO | WO-2008/143695 | A2 | 11/2008 |
| WO | WO-2008/147447 | A2 | 12/2008 |
| WO | WO-2008/156498 | A2 | 12/2008 |
| WO | WO-2008/156498 | A3 | 12/2008 |
| WO | WO-2008/127421 | A3 | 3/2009 |
| WO | WO-2008/147447 | A3 | 2/2010 |
| WO | WO008/143695 | A3 | 3/2010 |
| WO | WO-2008/121161 | A3 | 3/2010 |

OTHER PUBLICATIONS

Pending U.S. Appl. No. 11/237,990 entitled, "*Multiple-Transceiver Distributed Dynamic Channel Selection in a Communication Network*", 56 pages specification, claims and abstract, 5 pages of drawings, inventor Stephen P. Hershey, filed Sep. 27, 2005.

Pending U.S. Appl. No. 11/595,719 entitled, "*Autonomous Dynamic Spectrum Access*", 38 pages specification, claims and abstract, 16 pages of drawings, inventors Scott Y. Seidel, et al., filed Nov. 10, 2006.

Pending U.S. Appl. No. 11/595,717 entitled, "*Method and Apparatus for Adjusting Waveform Parameters for an Adaptive Air Interface Waveform*", 33 pages specification, claims and abstract, 3 pages of drawings, inventors Scott Y. Seidel, et al., filed Nov. 10, 2006.

Pending U.S. Appl. No. 11/595,542 entitled, "*Method and System for Using Selected Bearer Channels*", 31 pages specification, claims and abstract, 4 pages of drawings, inventors Scott Y. Seidel, et al., filed Nov. 10, 2006.

Pending U.S. Appl. No. 11/595,716 entitled, "*Scheduling for Autonomous Dynamic Spectrum Access Systems*", 40 pages specification, claims and abstract, 16 pages of drawings, inventor Scott Y. Seidel, filed Nov. 10, 2006.

Pending U.S. Appl. No. 11/595,493, entitled, "*Bearer Selection and Negotiation in Autonomous Dynamic Spectrum Access Systems*", 39 pages specification, claims and abstract, 16 pages of drawings, inventors Scott Y. Seidel, et al., filed Nov. 10, 2006.

Pending U.S. Appl. No. 11/595,718 entitled, "*Interference Avoidance for Autonomous Dynamic Spectrum Access Systems*", 39 pages specification, claims and abstract, 16 pages of drawings, inventors Scott Y. Seidel, et al., filed Nov. 10, 2006.

Jorgenson, M. et al., "Operation of the dynamic TDMA subnet relay system with HF bearers", *2005 IEEE Military Communications Conference, Vol. 1*, (Oct. 17-20, 2005),338-343.

Dimou, K. et al., "Generic Link Layer: A Solution for Multi-Radio Transmission Diversity in Communication Networks beyond 3G", *2005 62nd Vehicular Technology Conference*, (Sep. 25-28, 2005),1672-1676.

"International Serial No. PCT/US2007/021640 mailed Jun. 20, 2008", PCT/US2007/021640.

Bao, Lichun et al., "Channel Access Scheduling in Ad Hoc Networks with Unidirectional Links", *Computer Science Dept. and Computer Engineering Dept., University of CA, 2001*, (2001),1-10.

Bao, Lichun et al., "Hybrid Channel Access Scheduling in Ad Hoc Networks", *Computer Science Dept. and Compuiter Engineering Dept.*, University of CA, 2002, (2002),1-12.

Seidel, S. et al., "Autonomous dynamic spectrum access system behavior and performance", *In DySPAN 2005; First IEEE Symposium on new Frontiers in Dynamic Spectrum Access Networks*, (Nov. 2005), 180-183.

"U.S. Appl. No. 11/595,716, NFOA, mailed Mar. 3, 2009", all.

"U.S. Appl. No. 11/595,719, NFOA, mailed Mar. 2, 2009", 11/595,719,all.

ISR, "PCT/US2007/084375", *COGN-0017-PWO PCT Search Report*, (Jan. 22, 2009),all.

ISR, "International Search Report", PCT/US07/84374, (Dec. 8, 2008),all.

ISR, "PCT/US2007/084370", (Mar. 13, 2009).

"U.S. Appl. No. 11/595,719, Final Office Action mailed Jun. 19, 2009", 11/595,719, 3 Pgs.

"U.S. Appl. No. 11/595,717, Non-Final Office Action mailed Aug. 20, 2009", 3 pgs.

"U.S. Appl. No. 11/595,716, Final Office Action mailed Nov. 2, 2009", 11/595,716, 26 Pgs.

Zhao, J et al., ""Distributed coordination in dynamic spectrum allocation networks"", *Proc. IEEE DySPAN 2005* Nov. 2005, 259-268.

Akyildiz, I F., et al., "NeXt generation/dynamic spectrum access/ cognitive radio wireless networks: A Survey", *Computer Networks vol. 50.*, of Nov. 20, 2009, (May 17, 2006),2127-2159.

"International Application Serial No. PCT/US2007/084372, Search Report and Written Opinion mailed Dec. 16, 2009", PCT/US 2007/084372, 14 pgs.

"International Application Serial No. PCT/US2007/084371, Search Report and Written Opinion mailed Dec. 16, 2009", PCT/US2007/084371, 12.

"International Application Serial No. PCT/US2007/084376, Search Report and Written Opinion mailed Dec. 22, 2009", PCT/US2007/084376, 12 pgs.

"U.S. Appl. No. 11/595,493, Non-Final Office Action mailed Dec. 29, 2009", 11/595,493, 18 pgs.

"U.S. Appl. No. 11/548,763, Non-Final Office Action mailed Mar. 23, 2010", , 19.

"U.S. Appl. No. 11/595,719, Non-Final Office Action Jan. 27, 2010", , 29 Pgs.

"U.S. Appl. No. 11/595,717, Final Office Action mailed Apr. 19, 2010", , 26.

"U.S. Appl. No. 11/595,719, Final Office Action mailed May 14, 2010", , 5.

* cited by examiner

| 602 | 604 | 606 |
| --- | --- | --- |
| 608 | 610 | 612 |
| 614 | 616 | 618 |

*FIG. 6*

ADAPTIVE CONTROL CHANNEL INITIALIZATION OPERATIONS FOR AUTONOMOUS DYNAMIC SPECTRUM ACCESS SYSTEMS

The U.S. Government may have certain rights in this invention as provided for by the terms of Contract No. F30602-03-C-0079 awarded by the U.S. Air Force Research Laboratory as agent for the Defense Advanced Research Projects Agency (DARPA).

TECHNICAL FIELD

This invention relates generally to the field of wireless communications and more specifically to system and methods for performing adaptive control channel initialization operations in autonomous dynamic spectrum access.

BACKGROUND

Nodes in existing wireless communication systems generally contact each other using channels that are known are either fixed or determinable in advance. Known techniques, however, might not allow nodes in a wireless communication system to discover each other without predetermined channels, which may yield a less robust communications system. It is generally desirable to provide a robust communications system.

Existing wireless communication systems may employ frequency or channel hopping. Some existing systems may employ frequency or channel hopping where the dwell interval between hops varies based on channel metrics. Existing systems, however, do not provide dynamic spectrum access between wireless nodes using an adaptive control channel. Furthermore, existing systems do not provide dynamic spectrum access based on local and distributed spectrum awareness.

Existing wireless communications systems may perform frequency or channel hopping where one or more hop frequencies are eliminated based on channel metrics. Existing wireless communications systems do not, however, provide for selection and release of communications bearers based on local and distributed spectrum awareness. Furthermore, existing communications systems do not provide for bearer selection and release between wireless communications modes using an adaptive control channel.

Existing wireless communication system may perform frequency or channel hopping where a next hop time is communicated between a transmitter and receiver. Existing wireless communications systems, however, do not provide for dynamic spectrum access using an adaptive control channel. Furthermore, existing wireless communications systems do not provide for bearer selection and release based on local and distributed spectrum awareness. Furthermore, existing wireless communications system do not provide for interference avoidance by the use of an adaptive control channel and distributed spectrum awareness between nodes in a wireless communications system.

SUMMARY OF THE DISCLOSURE

In accordance with the present invention, disadvantages and problems associated with previous techniques for establishing communications between nodes are reduced or eliminated.

According to one embodiment of the present invention establishing communications between a plurality of nodes, includes determining a set of frequencies to search for neighbor nodes. Each of the plurality of nodes determines the set of frequencies autonomously. Zero or more neighbor nodes are detected by performing an adaptive control channel initialization operation using at least one frequency from the set of frequencies.

Certain embodiments of the invention may provide one or more technical advantages. A technical advantage of one embodiment may be that nodes can establish communications autonomously via an adaptive control channel initialization operation. Establishing communication between nodes by an adaptive control channel initialization operation may remove the need for a control channel to be defined before operations begin.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

Figure 6:
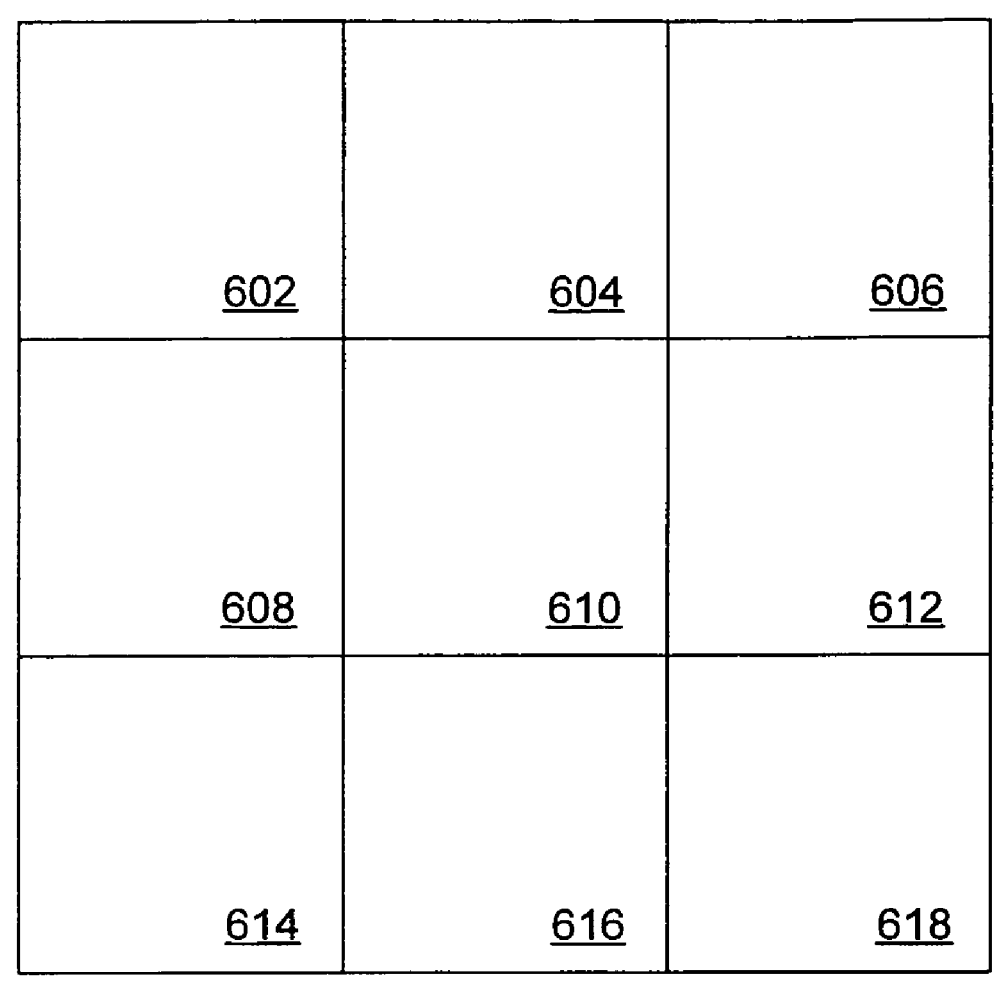

FIG. 6 is a block diagram illustrating one embodiment of geographic regions that may be used to generate a set of frequencies for rendezvous;

DETAILED DESCRIPTION OF THE DRAWINGS

Embodiments of the present invention and its advantages are best understood by referring to FIGS. 1 through 11 of the drawings, like numerals being used for like and corresponding parts of the various drawings.

Figure 1:
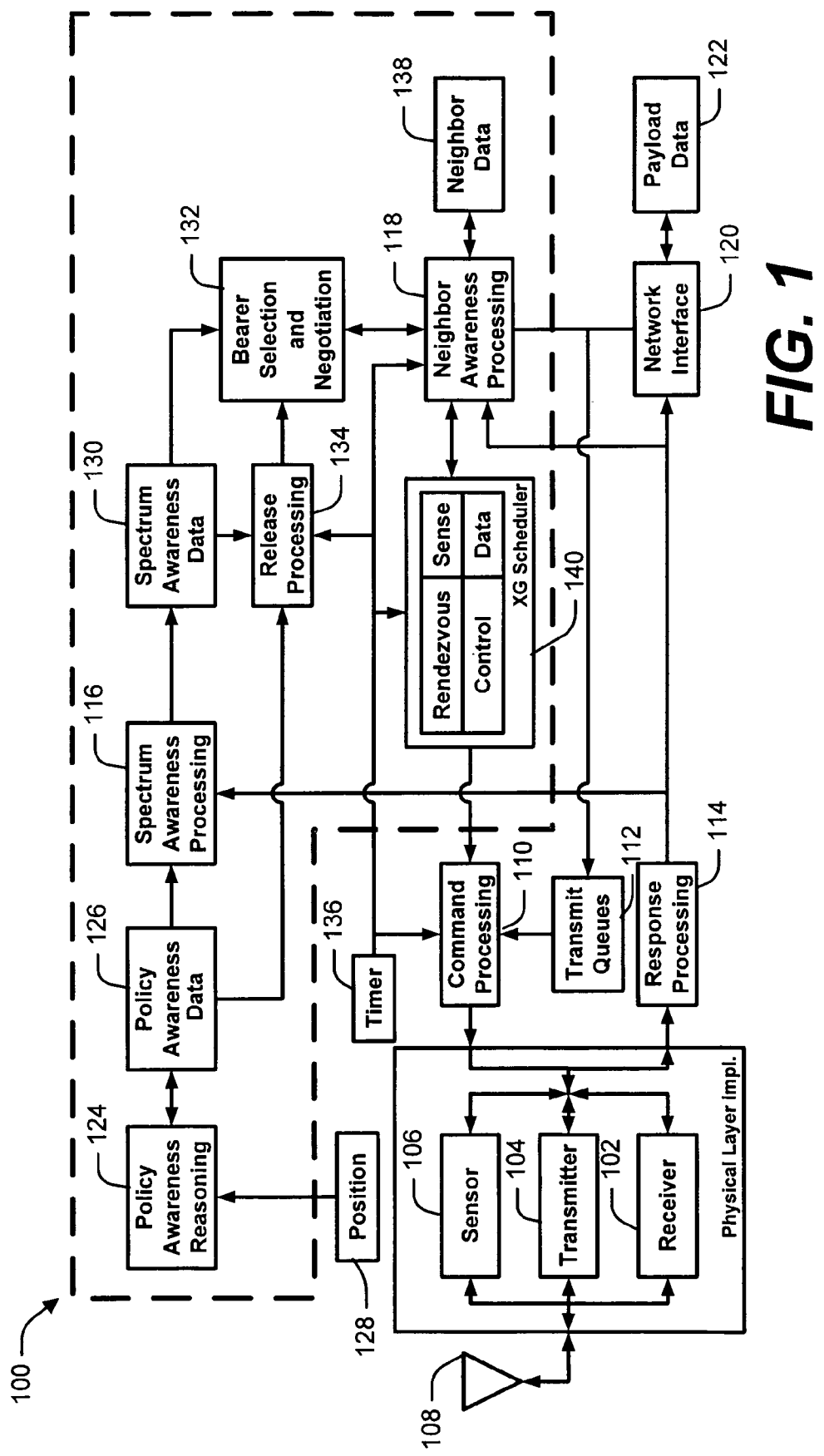
FIG. 1 is a block diagram illustrating one embodiment of a node of a communications system.

FIG. 1 is a block diagram illustrating one embodiment of a node, shown generally at 100, of a communications system.

In general, the node 100 may be any suitable device operable to communicate with another node 100. In general, a device may include any suitable arrangement of components operable to perform the operations of the device, and may comprise logic. "Logic" may refer to hardware, software, or a combination of hardware and software. Node 100 may comprise, for example, a personal digital assistant, a computer such as a laptop, a cellular telephone, a mobile handset, or any other device operable to communicate with another node 100.

Node 100 includes signal-handling components such as a receiver 102, a transmitter 104, and at least one sensor 106. In general, the sensor 106 is operable to measure at least one signal at a frequency. In some embodiments, the functionality of the sensor 106 may be performed by the receiver 102, or other components in node 100. In certain example embodiments, the sensor 106 may measure a plurality of signals at various frequencies in serial or parallel. In other implementations, the sensor 106 may determine a Fast Fourier Transform (FFT) of a range of frequencies. Two or more of the receiver 102, the transmitter 104, and the sensor 106 may be coupled together to operate using a common signal path from an antenna 108.

Node 100 may include command processing logic 110 to control the operation of one or more of the receiver 102, the transmitter 104, and the sensor 106. For example, the command processing logic 110 may control the tuning of the receiver 102 or the transmitter 104. In another example, the command processing logic may control a signal transmitted by the transmitter 104. In such an example, the command processing logic 110 may receive data from the transmit queue 112, which may store information to be transmitted.

Data from a signal received by the receiver 102 or from the sensor 106 may be routed to response processing logic 114. The response processing logic 114 may, in turn, route the data to one or more other portions of the node 100. For example, the response processing logic 114 may forward data to spectrum awareness processing logic 116, neighbor awareness processing logic 118, or a network interface 120. The network interface 120 may be coupled to other portion of the node 100 to handle payload data 122 received by, or to be transmitted by, the node 100.

The node 100 may include policy awareness reasoning logic to process policy entries, which may be loaded from or stored as policy awareness data 125. The policy entries may specify an allowed transmit power density corresponding to a sensed power density based on at least one of a frequency, a reference link budget, a location, or a time. For example, a policy entry may specify that a set of frequencies may not be used within a specified geographic area or during a certain time of day. As another example, a policy entry may specify that a first set of frequencies may be used with a specified power density so long as the sensed power density in the first set of frequencies is less than a threshold power density. The policy entries may allow the node 100 to recognize and cooperate with other spectrum users of a set of frequencies. The policy entries may also allow the node 100 to avoid other spectrum users of a set of frequencies.

The policy awareness reasoning logic 124 may receive a position 128, which may correspond to a geographic location of the node 100. The position input may be determined by any suitable means. In certain implementations, the policy awareness reasoning logic 124 may vary the policy entries in the policy awareness table 126 based on the position 128.

As described above, the spectrum awareness processing logic 116 may receive data from the response processing logic 114. In general, the spectrum awareness processing logic 116 may generate spectrum awareness data 130. The spectrum awareness processing logic 116 may create and maintain one or more data structures to store spectrum awareness data. The spectrum awareness data 130 may be stored any suitable data structure in any medium to store the spectrum awareness data 130. In certain example implementations, the spectrum awareness data 130 may be stored in one or more spectrum awareness tables. The spectrum awareness processing logic 116 may gather spectrum awareness data 130 based on spectrum activity sensed by the sensor 106. Spectrum awareness data 130 gathered in this manner may be referred to as "local awareness." In certain implementations, the spectrum awareness processing logic 116 may maintain current and historical spectrum awareness data 130.

The spectrum awareness processing logic 116 may also generate spectrum awareness data 130 based on spectrum activity sensed by other nodes 100, which then forward at least a portion of their spectrum awareness data 130 to node 100. This type of spectrum awareness may be referred to as "distributed spectrum awareness." Likewise, spectrum awareness data 130 stored in the node 100 may be transmitted to other nodes 100.

The node 100 may further include bearer selection and negotiation logic 132. In general, the bearer selection and negotiation logic 132 determines which one or more channels the node 100 will use for communication with one or more other nodes 100. When determining which one or more channels to use, the bearer selection and negotiation logic 132 may consider one or more of the spectrum awareness data 130 and the neighbor awareness data 138, which is discussed below.

The node 100 may further include release processing logic 134. In general, the release processing logic 134 recognizes when the node 100 should release a channel. The release processing logic 134 may consider policy entries from the policy awareness table 126 when determining whether to release a channel. The release processing logic may also receive a timer signal 136. The timer signal 136 may be useful, for example, to notify the release processing logic 134 to regularly determine if a channel should be released. The release processing logic 134 may signal the bearer selection and negotiation logic 132 that a channel should be released.

The neighbor awareness processing logic 118 may track the other nodes 100 with which node 100 may communicate. The neighbor awareness processing logic 118 may gather, generate, or store the neighbor awareness data 138, including, for example, the identities of neighbor nodes and other information describing neighbor nodes. In general, the neighbor data 138 may be stored in any suitable data structure in any medium to store data concerning neighbor nodes 100. The neighbor awareness processing logic 118 may store one-hop neighbors (i.e., those with which node 100 has established one or more bearer frequencies). The neighbor awareness processing logic 118 may also store two-hop neighbors (i.e., those with which neighbor nodes have established one or more bearer frequencies, but node 100 has not).

The node 100 may include a scheduler 140, which may receive the timer input 136 and may communicate with the neighbor awareness processing logic 118. In general, the scheduler 140 may control when the node 100 transmits, receives, or senses. In certain implementations, the scheduler 140 may allow the node 100 to communicate with neighbor nodes 100 using Time Division Multiple Access (TDMA) signaling. In such an implementation, the scheduler 140 may receive a synchronized time signal from the timer input 136, and based on the synchronized time signal, may control the operation of the receiver 102, transmitter 104, and sensor 106 to operate in certain time slots.

Figure 2:
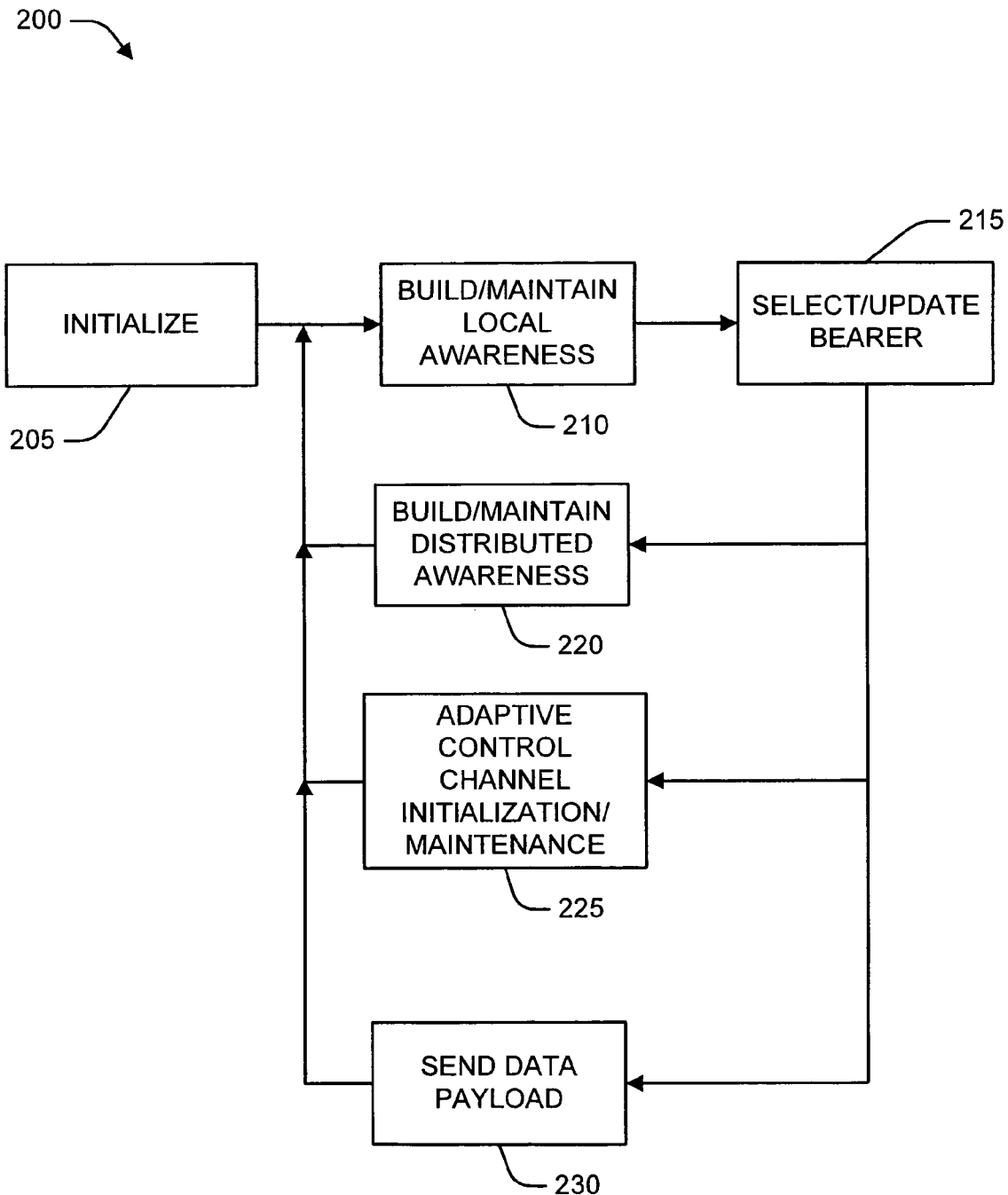
FIG. 2 is a flowchart illustrating one embodiment of a method of operation of the node.

FIG. 2 is a flowchart illustrating one embodiment of a method of operation of the node 100. The node 100 initializes in step 205. After the node 100 has initialized, it builds and maintains local awareness at step 210. The node 100 then selects or updates at least one bearer at step 215. Thereafter, the node 100 may build and maintain distributed awareness at step 220, perform an adaptive control channel initialization operation at step 225, or send a data payload at block 230. Regardless of the step chosen after step 215, the node 100 returns to step 210 and the cycle may repeat.

Figure 3:
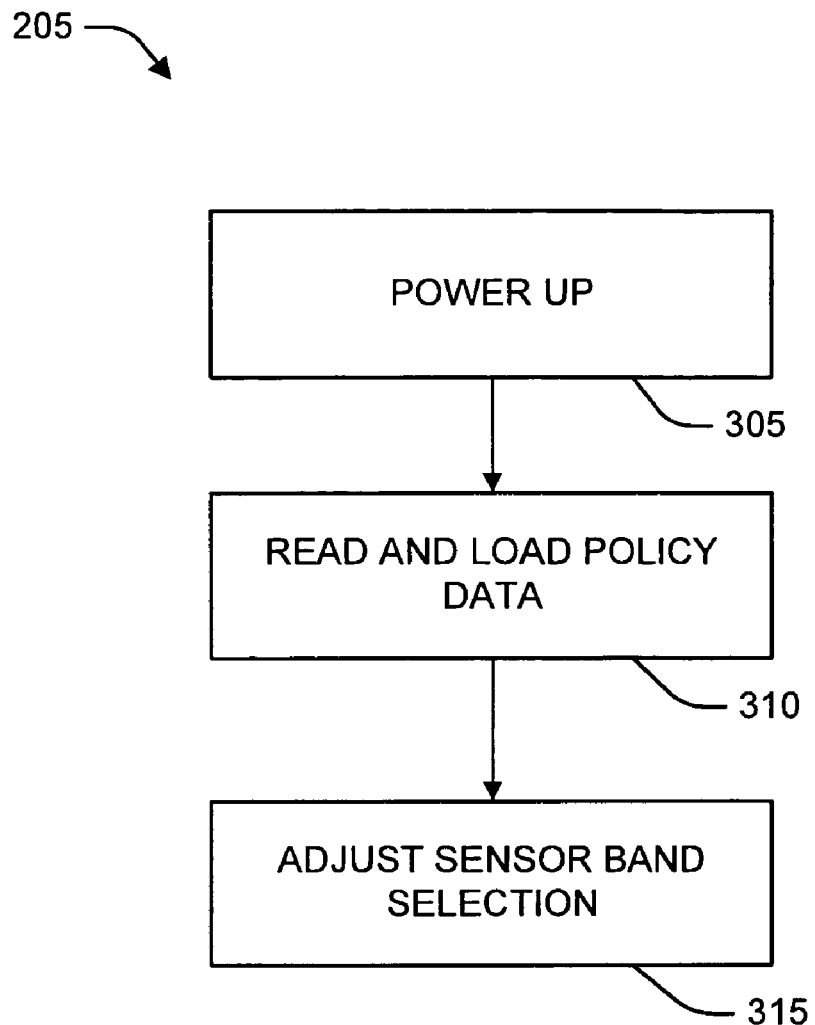
FIG. 3 is a flowchart illustrating one embodiment of initialization of the node.

FIG. 3 is a flowchart illustrating one embodiment of the initialization of node 100 (step 205). The node 100 may power up in step 305. The node 100 may then proceed to step 310, where it may read and load policy data 126. The node 100 may then proceed to step 315, where it may adjust the band selection of the sensor 106. The adjustment band selection of the sensor 106 may be based, at least in part, on the policy data 126.

After the node 100 has initialized, the spectrum awareness processing logic 116 may perform spectrum hole identification to determine at least one bearer to propose during the adaptive control channel initialization operation. The node 100 may use its sensor 106 to sense received RF power over one or more portions of spectrum. In certain implementations, the sensed RF power may be scored into fixed-width frequency bins. For example, the sensed RF power may be scored into 25 kHz bins. Contiguous bearer candidates may be formed with a mask at the minimum allowed power density across the occupied bandwidth. In addition to considering the minimum power density across the occupied bandwidth, the spectrum awareness processing logic 116 may further consider one or policy awareness data 126. The spectrum awareness processing logic may then calculate a sufficient transmit power for one or more of the bearer candidates.

Figure 4:
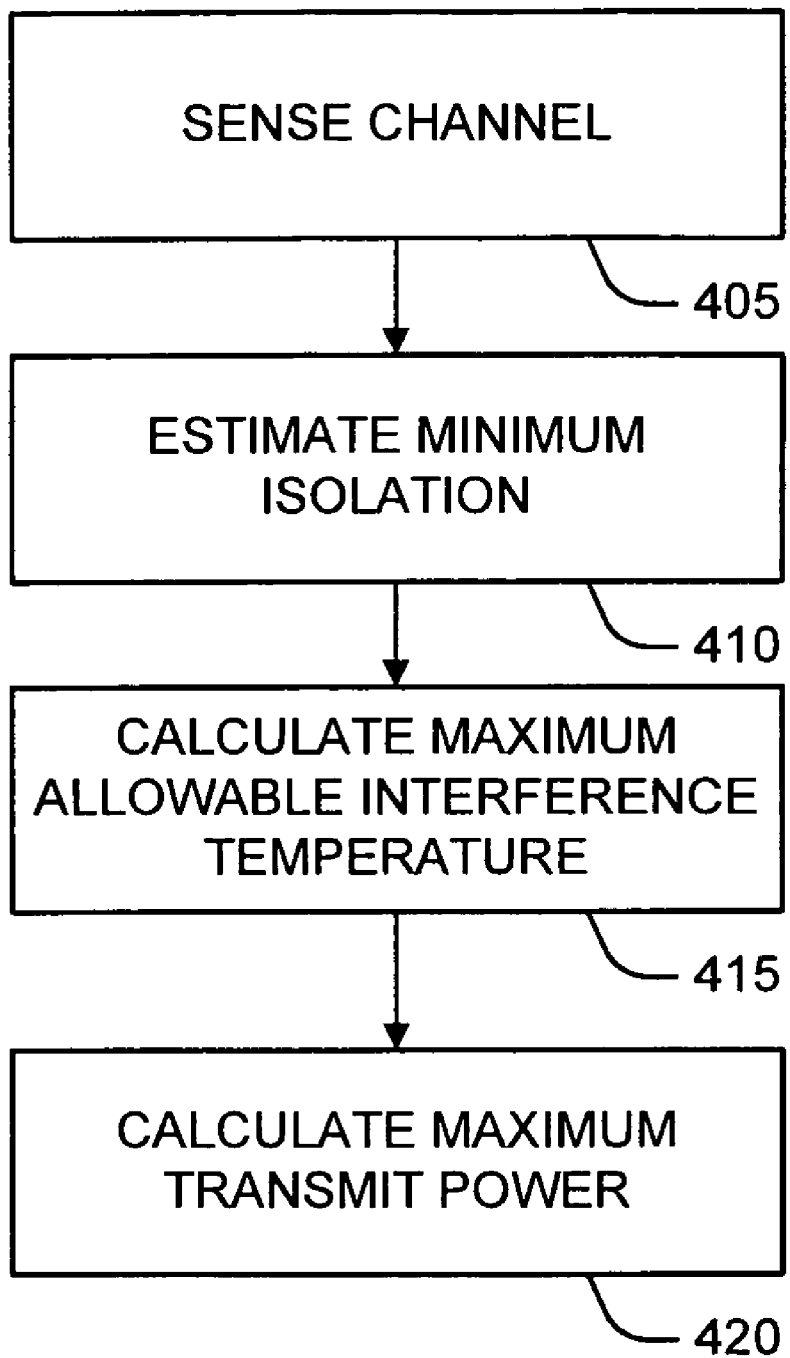
FIG. 4 is a flowchart illustrating one embodiment of spectrum awareness processing logic for calculating a link budget for a candidate bearer.

FIG. 4 is a flowchart illustrating one embodiment of the spectrum awareness processing logic 116 calculating a transmit power for the candidate bearer. In step 405, the channel is sensed, as described above with respect to determining one or more candidate bearers. The sensor 106 returns a received power ($P_R$) for the channel. Next in step 410, the spectrum awareness processing logic 116 estimates a minimum isolation between the node 100 and the signals sensed in the channel. In one example implementation, the minimum isolation ($ISO_{min}$) may be calculated using or derived from the following equation:

$$ISO_{min} = (P_{T1} - B_1) - \max((P_R - B_1), N_{0_X}) \qquad \text{(Equation 1)}$$

where $P_{T1}$ is the allowed transmit power of the current user of the channel in dBm, $B_1$ is the bandwidth used by the current user of the channel in dBHz, and $N_{0_X}$ is the noise power density of the sensor in dBm/Hz. $P_R$ is the observed power level in this channel, which may also be referred to as the interference temperature ($T_{int}$).

After the minimum isolation has been calculated in step 410, the spectrum awareness processing logic 116 may calculate a maximum allowable interference temperature in step 415. In certain implementations, the maximum allowable interference temperature may be determined by or derived from the following equation:

$$T_{0_{max}} = N_{0_1} - M(TH_D) \qquad \text{(Equation 2)}$$

where $N_{0_1}$ is the noise floor of the current user of the channel's receiver and $M(TH_D)$ is the maximum amount of degradation allowed to the signal of the current user of the channel and may be provided from a policy entry in the policy awareness data 126.

The spectrum awareness processing logic 116 may then calculate the maximum transmit power in step 420. In certain implementations, the maximum transmit power for the node 100 may be determined by or derived from the following equation:

$$P_{TX_{max}} = B_X + T_{0_{max}} + ISO_{min} \qquad \text{(Equation 3)}$$

where $B_X$ is the bandwidth to be used by the node 100 and $$P_{TX_{max}}$$

is the maximum power that the node 100 can transmit.

After the spectrum awareness processing logic 116 has determined at least one candidate bearer, the node 100 may proceed to the adaptive control channel initialization operation in step 225 to attempt to contact other nodes.

Figure 5:
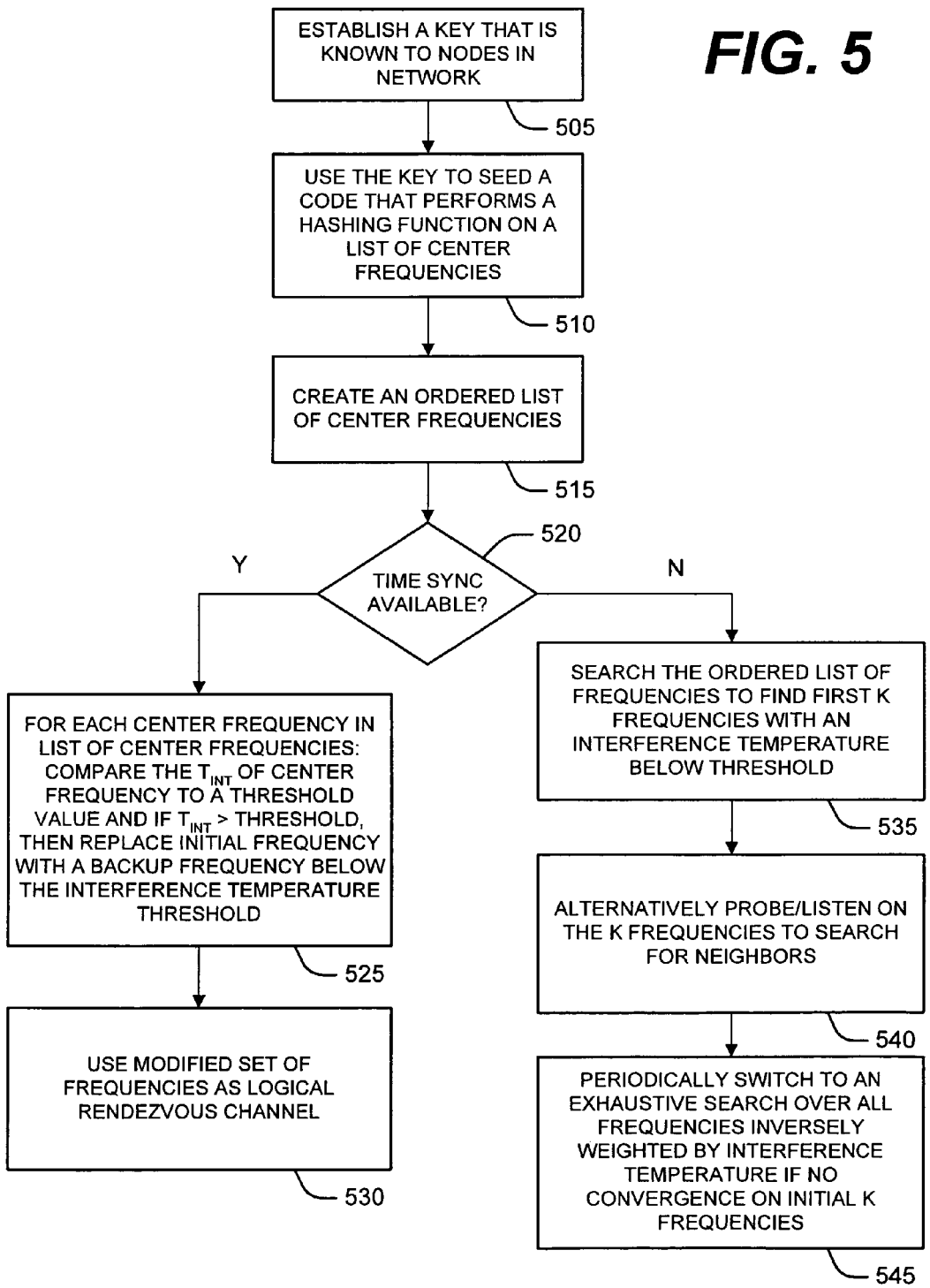
FIG. 5 is a flowchart illustrating one embodiment of the rendezvous operation.

FIG. 5 is a flowchart illustrating one embodiment of the adaptive control channel initialization operation. In certain implementations, the adaptive control channel initialization may be referred to as a rendezvous operation. In step 505, the node 100 establishes a key that is known to nodes in the network. In some implementations, this key may be preloaded into the node 100 and may be read during initialization (step 205). In step 510, using the key, the node 100 seeds a code that performs a hashing function on a list of frequencies. In step 515, the node 100 creates an ordered list of the list of frequencies.

In certain implementations, the node 100 may use information relating to its geographical location to seed the code that performs the hashing function on the list of frequencies. In general, the information relating to geographical location of the node 100 may be any information corresponding to the location of the node 100, such as latitude and longitude. For example, referring to FIG. 6, the regions 602-618 correspond to a grid of latitude and longitude positions. Although the regions are shown as squares in FIG. 6, in general, they may be any shape or relative size. The node 100 may be located in region 610. The node 100 may assign a code to each of the regions 602-618, where each code corresponds to at least one frequency when the hashing function is applied to the code. In such an implementation, the minimum search space of frequencies is nine (i.e., one for each region 602-618). In other implementations, the node 100 may select multiple frequencies corresponding to each of the regions 602-618.

In certain example implementations, the node 100 may be a member of one or more groups, each identified by a group identifier that is stored on the node 100. In these example implementations, when the node 100 attempts to establish an adaptive control channel for communication with other members of one of the one or more groups, the node 100 may seed the hashing function using, at least in part, the group identifier.

In other example implementations, the node 100 may seed the hashing function using, at least in part, a time, such as a current time.

Returning to FIG. 5, if time synchronization to a common time base across nodes is available (step 520), the node 100 may perform the adaptive control channel initialization operation using a logical channel, which may be referred to as a Logical Rendezvous Channel (LRC). In general, the LRC is a set of TDMA time and frequency slots. Over time, the frequencies used by nodes 100 using LRC may span the entire range of useable frequencies. In step 525, the node steps though each center frequency in the ordered list of frequencies. If the interference temperature ($T_{INT}$) of the center frequency is greater than a threshold interference temperature, the node replaces the initial frequency in the ordered list of frequencies with a backup frequency that has a $T_{INT}$ below the threshold interference temperature. In step 530, the node 100 uses the modified set of frequencies as a LRC.

If, however, a time synchronization across nodes is not available (step 520), the node 100 may perform the adaptive control channel initialization operation using an interference temperature directed search. In step 535, the node 100 searches the ordered list of frequencies to find the first K frequencies with a $T_{INT}$ below the threshold $T_{INT}$. In step 540, the node alternatively probes or listens on the K frequencies to search for neighbors. The node 100 may transmit and listen for probes for an amount of time, which may be referred to as a tick. The node 100 may alter the length of the tick during one or more adaptive control channel initialization operation cycles to help create overlap between different nodes listening/transmitting on a single frequency at the same time. In certain example embodiments, the node 100 may transmit twice during a tick to increase the chances of overlapping with a second node 100 listening during the tick.

If the search in step 545 is unsuccessful, in step 545, the node 100 may periodically switch to an exhaustive search over all the frequencies in the ordered list. For certain example implementations the frequencies in the order list may be inversely weighted by $T_{INT}$.

In certain implementations, the node 100 may use a linear feedback shift register to generate a pseudo-random sequence for use in choosing the next center frequency.

When the node 100 is transmitting an adaptive control channel initialization message it may transmit one or more of a Source Node ID, to identify itself, a Destination Node ID addressed to a broadcast address, the selected bearer, the one-hop neighbor table, and a useable bearer table. In implementations where the node 100 is part of a network the usable bearer table may include bearers in use by one-hop neighbors of the node 100.

When the node 100 receives an adaptive control channel initialization message from another node 100 it may respond with an acknowledgement (ACK) message to begin communicating with the other node 100 on the selected bearer and add the other node 100 to its list of one-hop neighbors. If however, the selected bearer is not usable for the node 100, it may reply with a bearer rejection, and the other node 100 may select a new bearer and transmit another adaptive control channel initialization message.

After the node 100 has established contact with one or more other nodes 100, it may continue to send out adaptive control channel messages to advise nodes 100 in the network of, for example, its selected bearer, and to find other nodes 100 not currently in the network. The node 100 may also send and receive adaptive control channel maintenance messages to maintain or adapt the adaptive control channel.

In certain implementations, node 100 may establish multiple adaptive control channels. For example, as discussed above, the node 100 may be a member of multiple groups and may use different adaptive control channels to communicate with the members of each of the groups, respectively.

Figure 7:
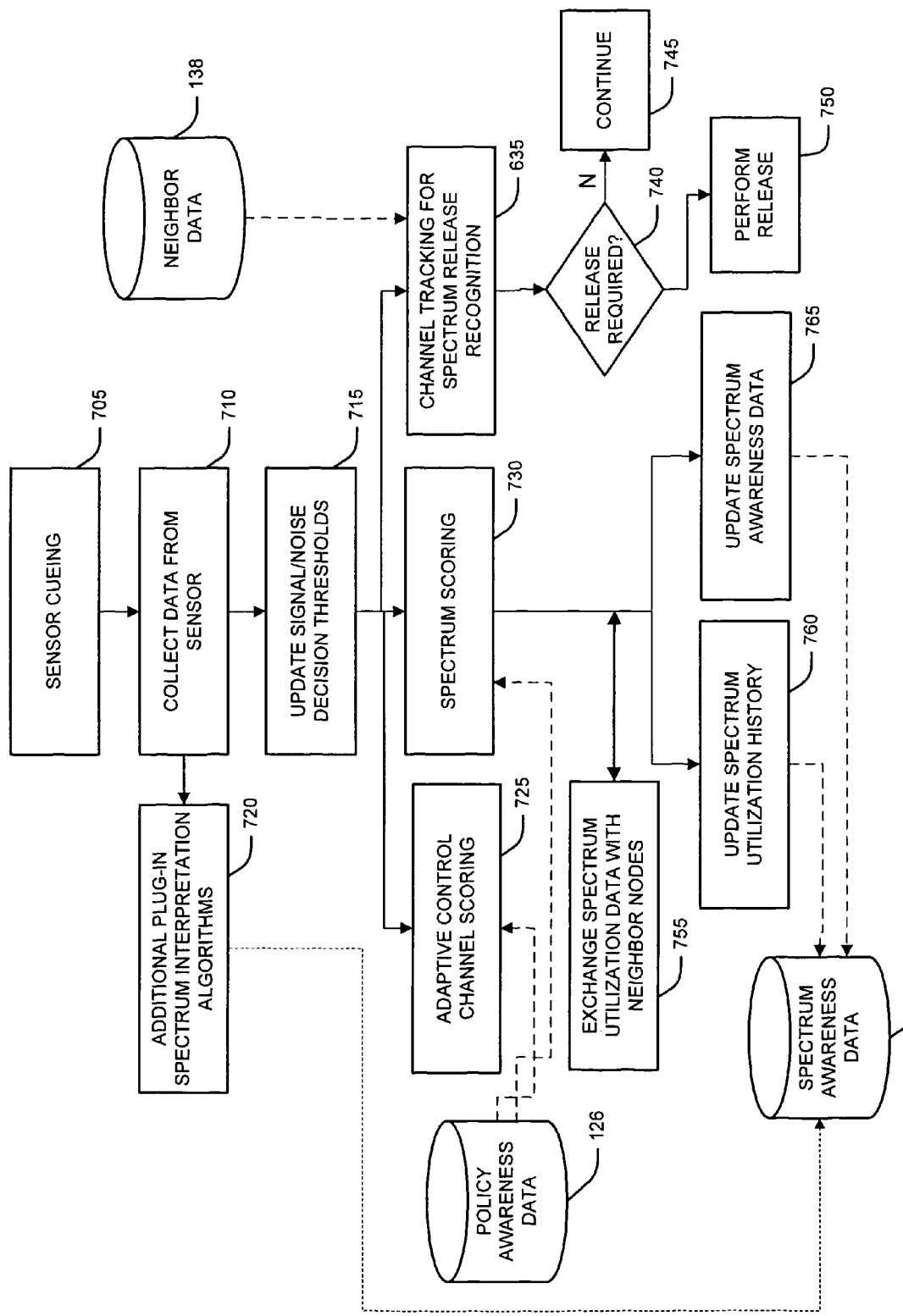
FIG. 7 is a flowchart illustrating one embodiment of the spectrum awareness processing logic.

FIG. 7 is a flowchart illustrating one embodiment of the spectrum awareness processing logic 116. The spectrum awareness processing logic 116 starts at step 705 by cueing the sensor 106 to receive certain frequency ranges. The spectrum awareness processing logic 116 then collects data from the sensor 106 in step 710. Based on the data collected the spectrum awareness processing logic 116 may update the signal to noise decision thresholds for the evaluated frequencies. In certain implementations, in step 720 the spectrum awareness processing logic 116 may apply additional plug-in spectrum interpretation procedures to the data collected from the sensor 106. The plug-in spectrum interpretation procedures may produce output to the spectrum awareness data 130.

After step 715, the spectrum awareness processing logic 116 may perform adaptive control channel initialization scoring in step 725. Step 725 may also consider policy awareness data 126 when performing the adaptive control channel scoring. The adaptive control channel scoring may be used to determine candidate bearer frequencies for use as an adaptive control channel, as described with respect to FIG. 5.

The spectrum awareness processing logic 116 may also use the data collected from the sensor 106 for spectrum scoring in step 730. The spectrum scoring may also consider the policy awareness data 126. The spectrum scoring may include determining transmit power levels derived from typical operating parameters of licensed spectrum users, as described with respect to FIG. 4.

In step 735, the spectrum awareness processing logic 116 may also use the data from the sensor 106 for channel tracking for spectrum release recognition. In some implementations, the spectrum awareness processing logic 116 may subtract the signals caused by the network which node 100 is a member of before determining whether release is necessary for one or more bearers. Subtracting the network signals may reduce the likelihood of false alarms. The spectrum awareness processing logic 116 may determine the signals caused by the network by using information from the neighbor data 138, which may include the information concerning the bearer frequencies used by neighbors of node 100. If spectrum awareness processing logic 116 determines that a release is not required in step 740, it may continue in step 745. Otherwise, in step 750, it may perform a release of the one or more identified bearer frequencies.

In step 755, the spectrum awareness processing logic 116 may exchange spectrum utilization data with one or more neighbor nodes. In some implementations, this step 755 may be performed using a Hole Exchange Protocol (HEP). The exchange of hole information may be prompted by a request from the node 100. In general, one or more of the nodes 100 send one or more portions of spectrum designated as holes to one or more neighbor nodes, and vice versa. This exchange of holes identified by node 100 and the neighbor nodes 100 may be used to update spectrum utilization history in step 760 and to update the spectrum awareness data 130 in step 765.

Figure 8A:
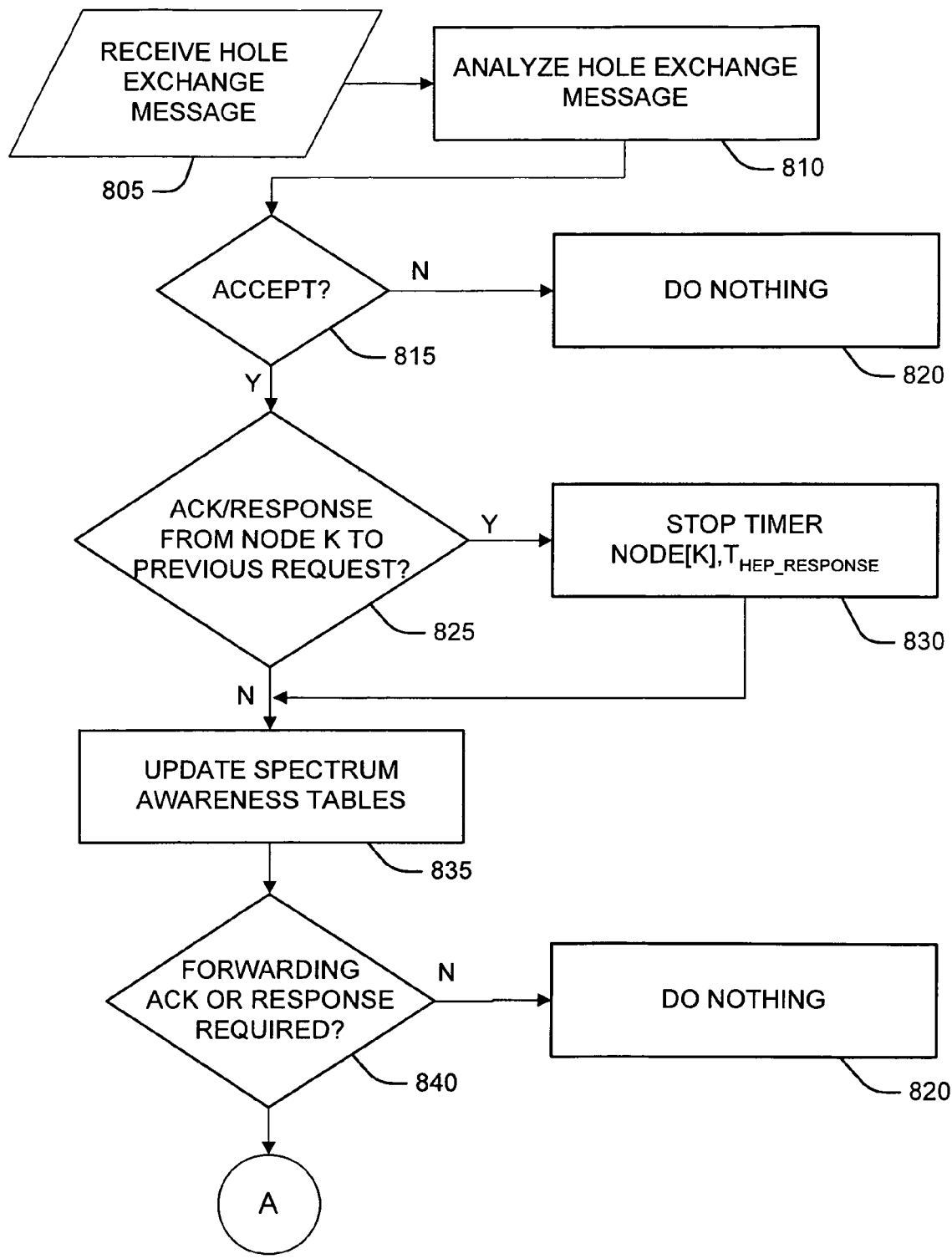
FIGS. 8A and 8B are flowcharts illustrating one embodiment of a hole exchange process.
Figure 8B:
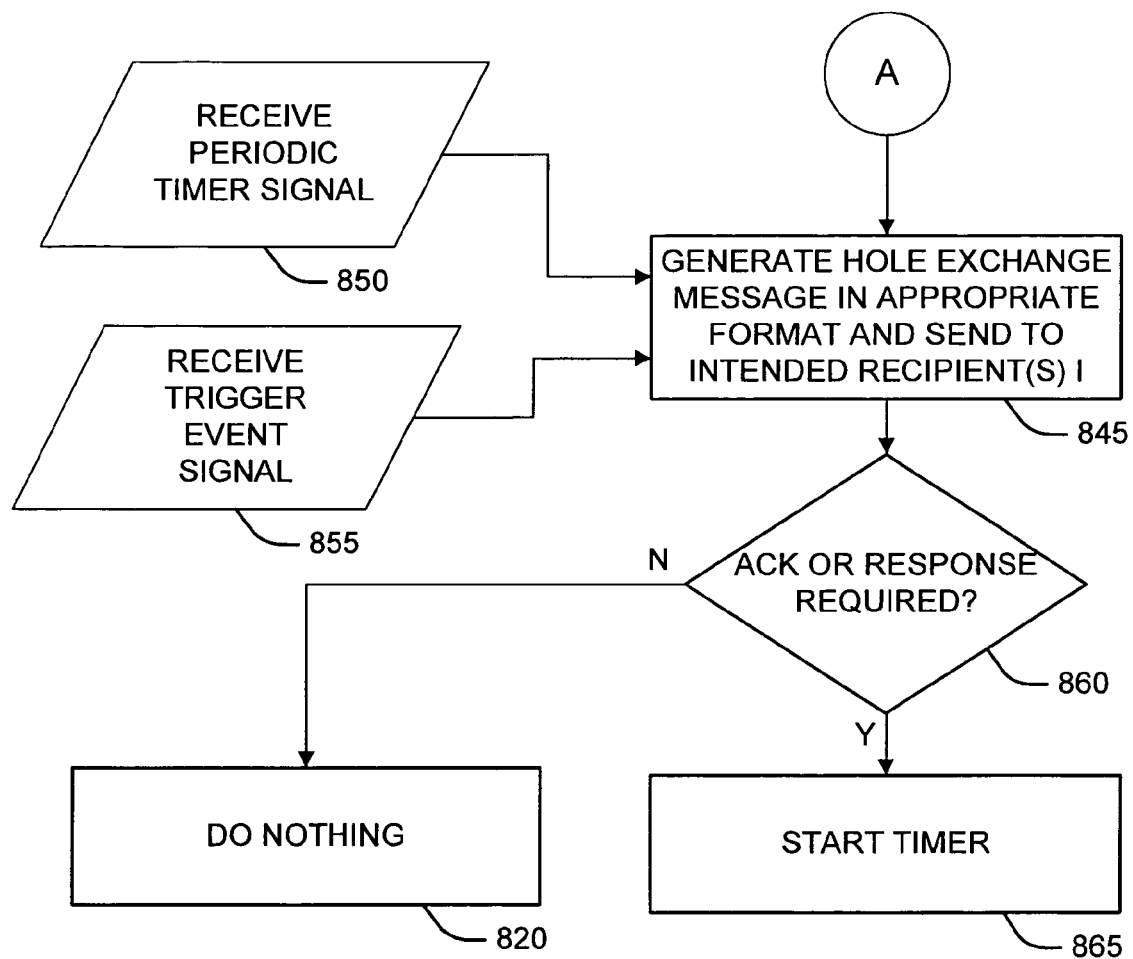

FIGS. 8A and 8B are flowcharts illustrating one embodiment of a process for exchanging hole information between nodes 100. In general, the node 100 may exchange hole information with neighbor nodes 100. This exchange of hole information may be accomplished using a Hole Exchange Protocol (HEP). In certain example embodiments, the hole exchange messages may include one or more of an group ID of the node 100, a hole exchange message type (e.g., request or response), a source node address, a destination node address, one or more spectral hole information request information elements, and one or more spectral hole information response information elements. In general, the one or more spectral hole information request information elements may describe parameters of the hole such as start and stop frequencies and the channelization. The spectral hole information response information elements may include start and stop frequencies, channelization, timestamp, scoring resolution, compression information, hole information, and an acknowledgement required indicator.

In step 805, the node 100 receives a hole exchange message from another node 100. The node 100 may analyze the hole exchange message in step 810. The analysis in step 810 may include determining the contents of the hole exchange message. The analysis in step 810 may include consulting spectrum awareness data 130 and the policy awareness data 126 to determine if the received hole exchange message is consistent with spectrum awareness data 130 and policy awareness data 126, and determine if one or more of the two should be updated.

The node 100 may determine whether to accept the hole exchange message in step 815 and, if so, it may proceed to step 825, otherwise it may do nothing in step 820. In step 825, the node 100 determines if the received hole exchange message is an acknowledgement message (ACK) or a response corresponding to a previous hole exchange request. If the received hole exchange message is an acknowledgement message (ACK) or a response corresponding to a previous hole exchange request, the node 100 may stop a timer associated with the request in step 830. In either case, the node 100 proceeds to step 835 where it may update the spectrum awareness data 130 based on the received hole exchange message.

The node 100 determines, in step 840, whether it should transmit an acknowledgement (ACK) or a response based on the received hole exchange message. If the node 100 determines that it does not need to transmit an acknowledgement (ACK) or a response based on the received hole exchange message, it may do nothing in step 820. Otherwise, in step 845, the node 100 may generate a hole exchange message in an appropriate format and send the hole exchange message to the intended recipient nodes 100. In certain example embodiments, the hole exchange message generated in step 845 may be based on policy awareness data 126, spectrum awareness data 130, neighbor data 138, other data, or any combination of the preceding.

The node 100, in step 860, may determine if it expects an acknowledgment (ACK) or a response from the hole exchange message sent in step 845 and, if so, it may start one or more timers corresponding to the node or nodes to which hole exchange message was sent. Otherwise, if the node 100 does not expect an acknowledgement (ACK) or a response to the hole exchange message sent in step 845, it may do nothing in step 845.

The generation and sending of a hole exchange message (step 845) may also be invoked by receiving a periodic timer signal in step 850 or by receiving a trigger event signal in step 855. For example, if one of the timers set in step 865 times out, then the node 100 may generate and send a new hole exchange message in step 845.

Figure 9:
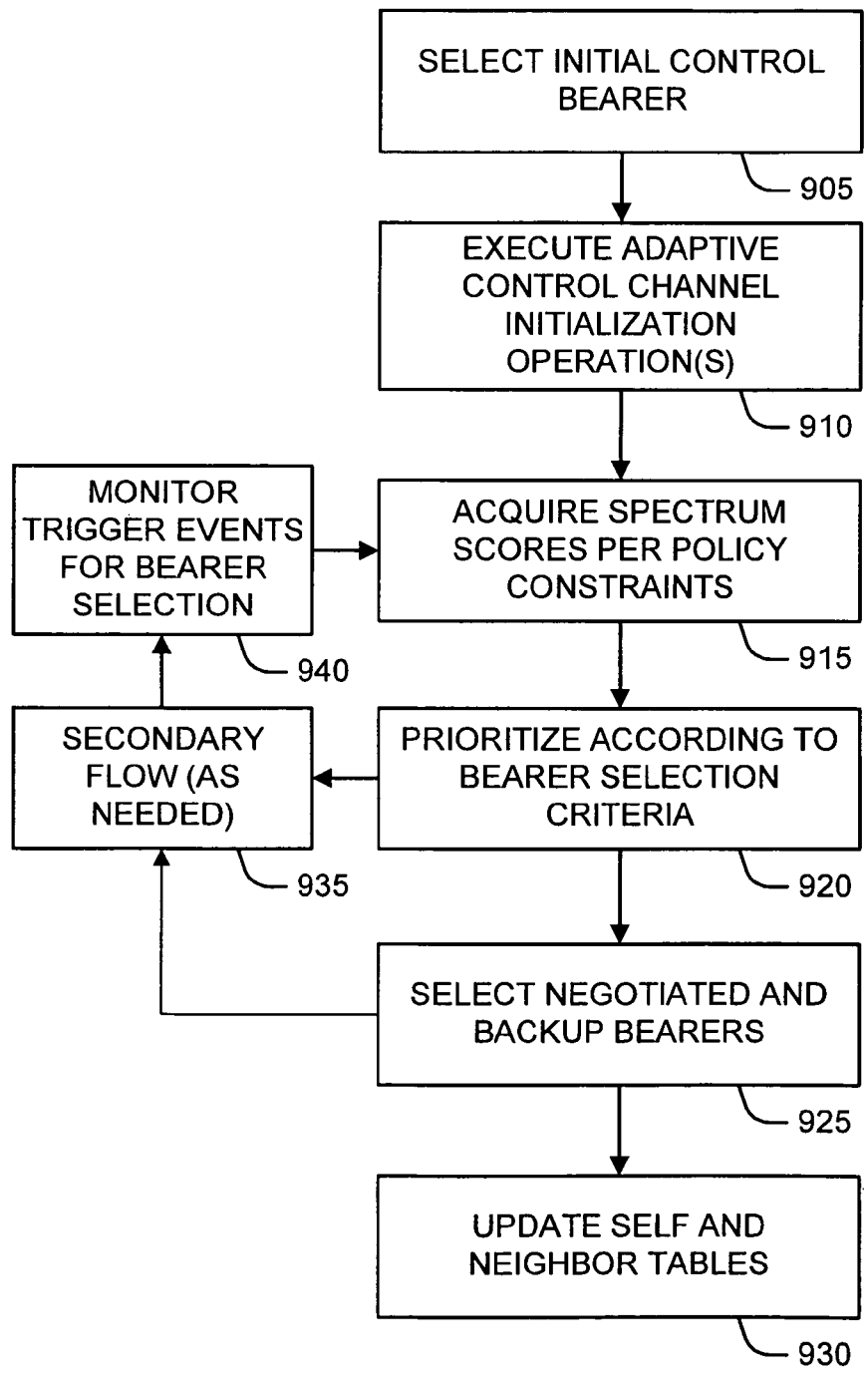
FIG. 9 is a flowchart illustrating one embodiment of a bearer negotiation process.

FIG. 9 is a flowchart illustrating one embodiment of a bearer negotiation process. The bearer selection and negotiation logic 132 selects an initial control bearer in step 905. The bearer selection and negotiation logic 132 may also designate an initial data bearer. In step 910, the node 100 may then perform an adaptive control channel initiation or management operation, as described with respect to FIG. 5. The bearer selection and negotiation logic 132 may evaluate one or both of policy awareness data 126 and spectrum awareness data 130 in step 915. This step may include obtaining spectrum scores from one or more neighbor nodes if allowed by policy awareness data 126.

In certain example implementations, the proposed bearer may be defined by a waveform to fill a suitable set of frequencies. For example, the proposed bearer may have a heteromorphic waveform to utilize an irregular portion of spectrum.

In step 920, the bearer selection and negotiation logic 132 may prioritize the candidate bearers based on one or more bearer selection criteria. For example, the bearer selection and negotiation logic 132 may select a candidate bearer based on the channel score, as observed by the sensor 106. In certain implementations, the channel score may be based on the maximum power that may be transmitted on the channel, as described with respect to FIG. 4.

In another example implementation, the one or more candidate bearers may be selected based on a minimum frequency spread from one or more existing bearers. For example, the candidate bearer may be chosen so that it is in the same frequency band as one or more existing bearers used by one or more neighboring nodes. In yet another example implementation, the system may select a candidate bearer with the longer time history of white space availability. In still another example implementation, the bearer may be selected randomly from among the feasible bearer alternatives.

In another example implementation, the bearer selection and negotiation logic 132 may select that usable channel with the lowest score above the acceptability threshold for use as the bearer. This implementation may increase spatial reuse, leaving other frequencies available for other nodes 100.

In step 925, the bearer selection and negotiation logic 132 may select negotiated main and backup bearers and may update spectrum awareness data 130 and neighbor data 138 to reflect the negotiated bearers.

In step 935, the bearer selection and negotiation logic 132 may initiate a secondary flow, if necessary. A secondary flow (e.g., a second set of bearers) may be necessary to handle a larger bandwidth capacity.

In step 940 the bearer selection and negotiation logic 132 may monitor trigger events for bearer selection. These trigger events may include, for example, observations by the sensor 106 or hole information updates for release actions.

Figure 10:
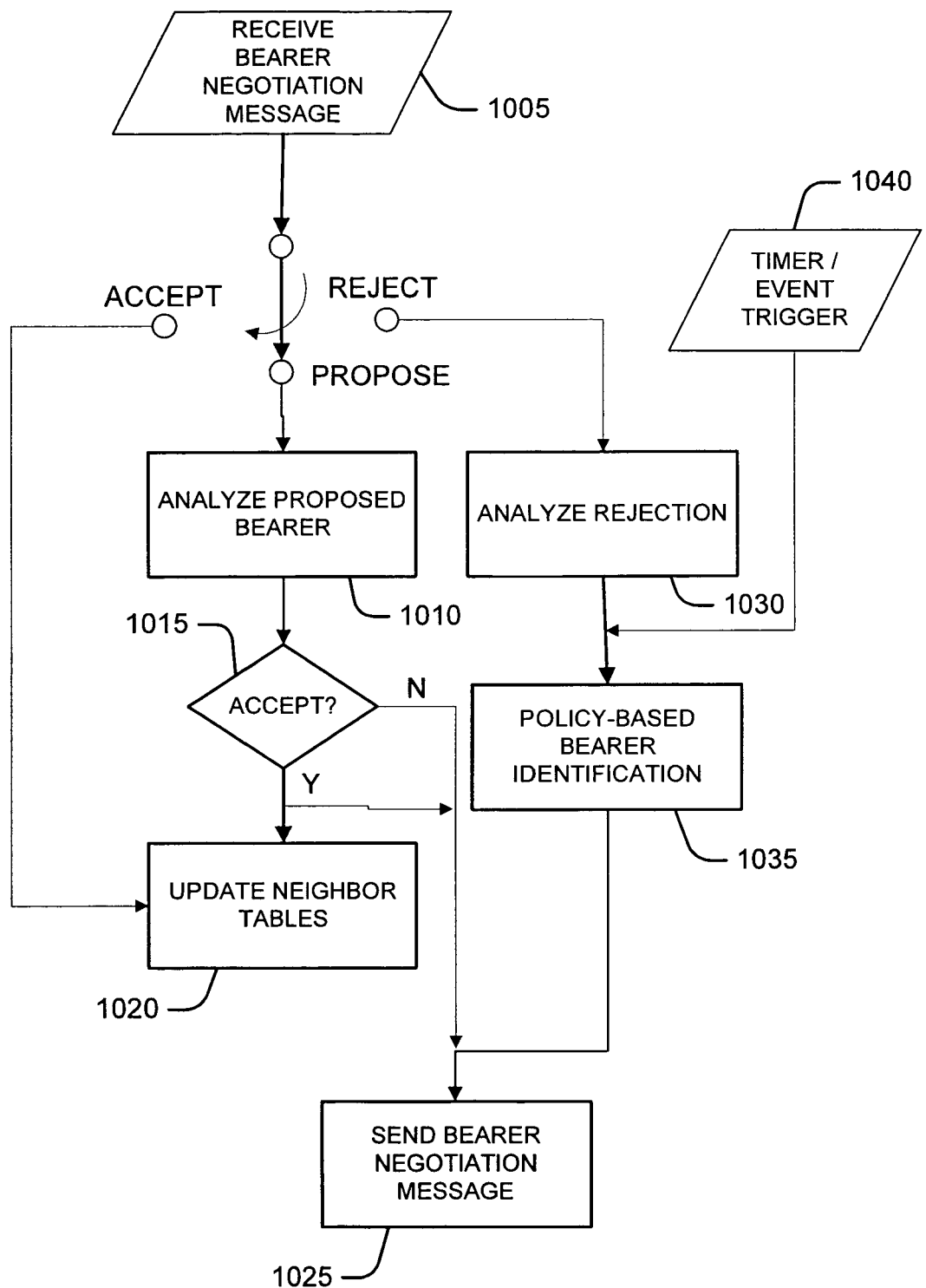
FIG. 10 is a flowchart illustrating one embodiment of a bearer negotiation process.

FIG. 10 is a flowchart illustration of one embodiment of a bearer negotiation process. In step 1005, the node 100 may receive a bearer negotiation message. In general, the bearer negotiation messages may be of three types: acceptance, proposal, or rejection. If the bearer negotiation message is an acceptance message, the node 100 proceeds to block 1020 and may update the neighbor data 138 to reflect the accepted bearer. If the bearer negotiation message is a proposal message, the node 100 may analyze the proposed bearer in step 1010. If the proposed bearer is acceptable (step 1015), the node 100 may update the neighbor data 138 to reflect the proposed and accepted bearer and may send a bearer acceptance message in step 1025. If, however, the proposed bearer is not acceptable (step 1015), then the node 100 may send a bearer rejection message in step 1025.

If the received bearer negotiation message is a rejection message, the node 1010 may analyze the rejection in step 1030 and may perform policy-based bearer identification in step 1035. Step 1030 may also be triggered by receiving a timer or event trigger in block 1040. After steps 1030 and 1035, the node 100 may send a new bearer proposal message in block 1025.

Figure 11:
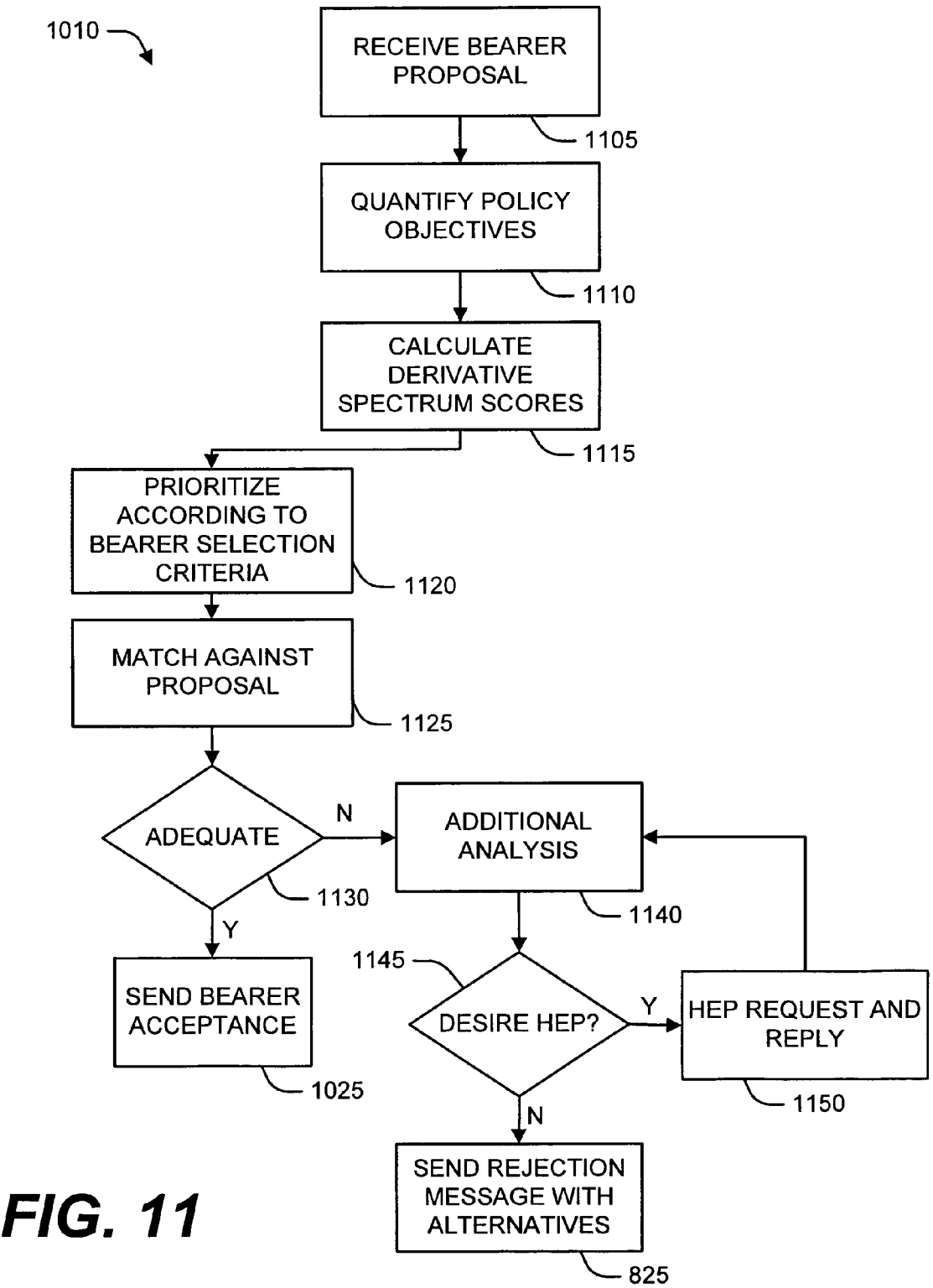
FIG. 11 is a flowchart illustrating one embodiment of analyzing a bearer proposal.

FIG. 11 is a flowchart illustrating one embodiment of analyzing a bearer proposal, as described in step 1010 of FIG. 10. In general, the bearer analysis is to assess frequencies for suitability as bearers. For example, the node 100 may want to ensure that there is sufficient frequency separation to avoid near/far interference in a wireless ad hoc topology. The node 100 may also want to minimize the separation between bearers to remain within a common wideband sensor bandwidth.

The node 100 receives the bearer proposal in step 1105 and proceeds to quantify policy objectives in step 1110. The node 100 may consider policy awareness data 126 when performing step 1110. In general, step 1110 may guide the analysis of the proposed bearer along policy-based motivations. The node 100 then calculates derivative spectrum scores in step 1120. The calculation in step 1120 may be based on policy awareness table 126 and spectrum awareness data 130. In general, the node 100 may determine one or more acceptable bearers for itself.

The node 100 may then prioritize the bearer candidates determined in step 1115 according to bearer selection criteria. These criteria are discussed above with respect to step 920 of FIG. 9. In step 1120, the node 100 may compare the prioritized bearers to the proposed bearer. If the proposed bearer is acceptable, the system sends a bearer acceptance message at block 1025. If, however, the proposed bearer is not acceptable, the node 100 may perform additional analysis at block 1140 to determine acceptable bearers to both the node 100 and the node 100 that proposed the bearer.

The node 100 may choose to use a Hole Exchange Protocol (HEP) to obtain additional distributed spectrum awareness in block 1145. In that case, the node 100 may send one or more HEP requests and receive one or more HEP replies at step 1150. The node may then perform additional analysis in light of the HEP replies from one or more other nodes. Once the node 100 is done with HEP (step 1145), it sends a rejection message which may designate one or more alternative bearers at step 1155.

Figure 12:
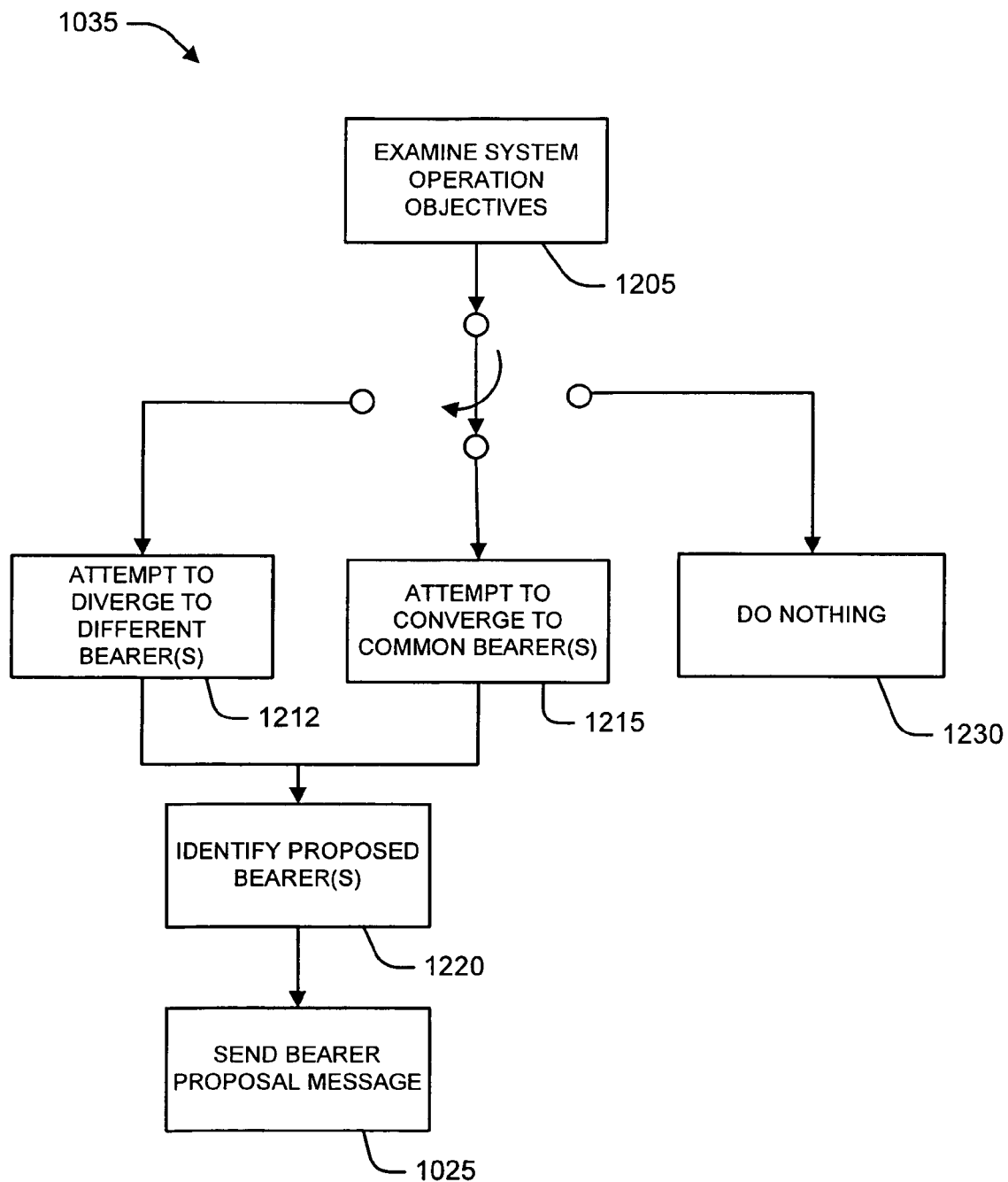
FIG. 12 is a flowchart illustrating one embodiment of performing policy-based bearer identification.

FIG. 12 is a flowchart illustrating one embodiment of performing policy-based bearer identification, as shown in step 1035 of FIG. 10. In step 1205, the node 100 examines one or more system operation objectives. These objectives may be derived from one or more policy entries in the policy awareness data 126. Based on the analysis in step 1205, the node may attempt to diverge to different bearers in step 1210. The node 100 may attempt to diverge to deal with a high offered load in the presence of sufficient spectrum opportunities. The node 100 may attempt to diverge to facilitate unicast network flows among neighbor nodes. The node 100 may attempt to diverge to take advantage of multiple receivers in one or more of the nodes 100 in the network. The node 100 may also attempt to diverge for initial link establishment via an adaptive control channel initialization operation.

In other situations, the node 100 may attempt to converge to fewer common bearers in step 1215. The node 100 may attempt to converge to fewer common bearers to satisfy policy-based spectrum usage triggers. For example, the node 100 may attempt to operate with a minimum spectral footprint. The node 100 may attempt to converge to fewer common bearers for more efficient broadcast, multicast, or relay-forward operation. The node 100 may attempt to converge to fewer common bearers due to limited spectrum availability. The node 100 may attempt to converge to fewer common bearers after an adaptive control channel initialization operation.

After either of steps 1210 or 1215, the node 100 may identify one or more proposed bearers in step 1220 and send a bearer proposal message in step 1025.

If however, the node 100 does not attempt to converge to common bearers or diverge to different bearers, it may do nothing in step 1230.

Figure 13:
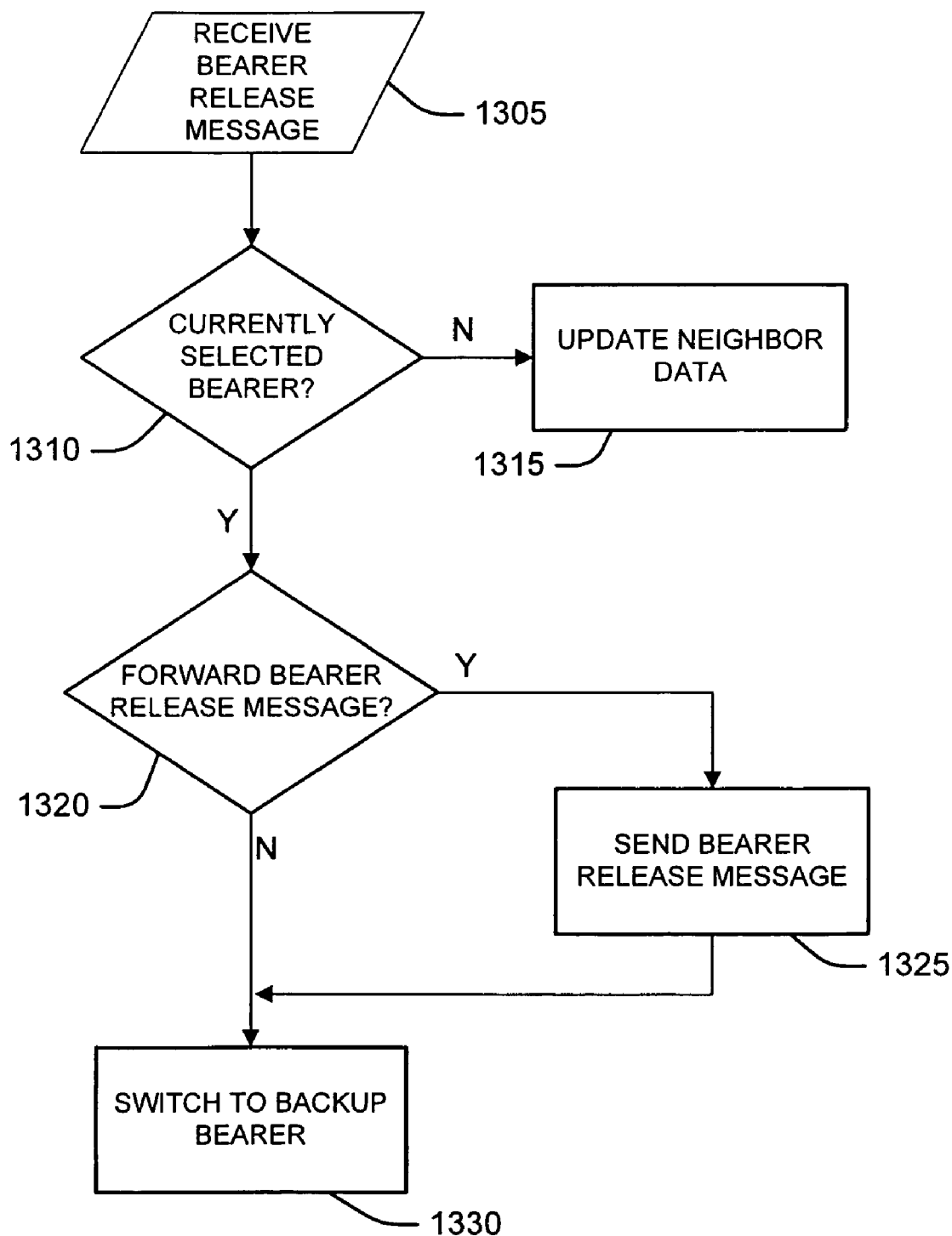
FIG. 13 is a flowchart illustrating one embodiment of handling a bearer release message.

FIG. 13 is a flowchart illustrating one embodiment of handling a bearer release message. The node 100 receives a bearer release message in step 1305. If one or more of the bearers identified in the bearer release message is the currently selected bearer (step 1310), then the node 100 proceeds to step 1320. Otherwise, in step 1315, the node 100 updates the neighbor data 138 to reflect the released bearer.

In step 1320, the node 100 determines whether to forward the bearer release message to neighbor nodes, and if so it sends a bearer release message in step 1325. The node 100 may choose to forward the bearer release message to neighbor nodes who did not receive the release message initially. In either case, the node 100 proceeds to step 1330, where it switches to a backup bearer. In certain implementations, there is a fixed time to switch to the backup bearer.

Figure 14:
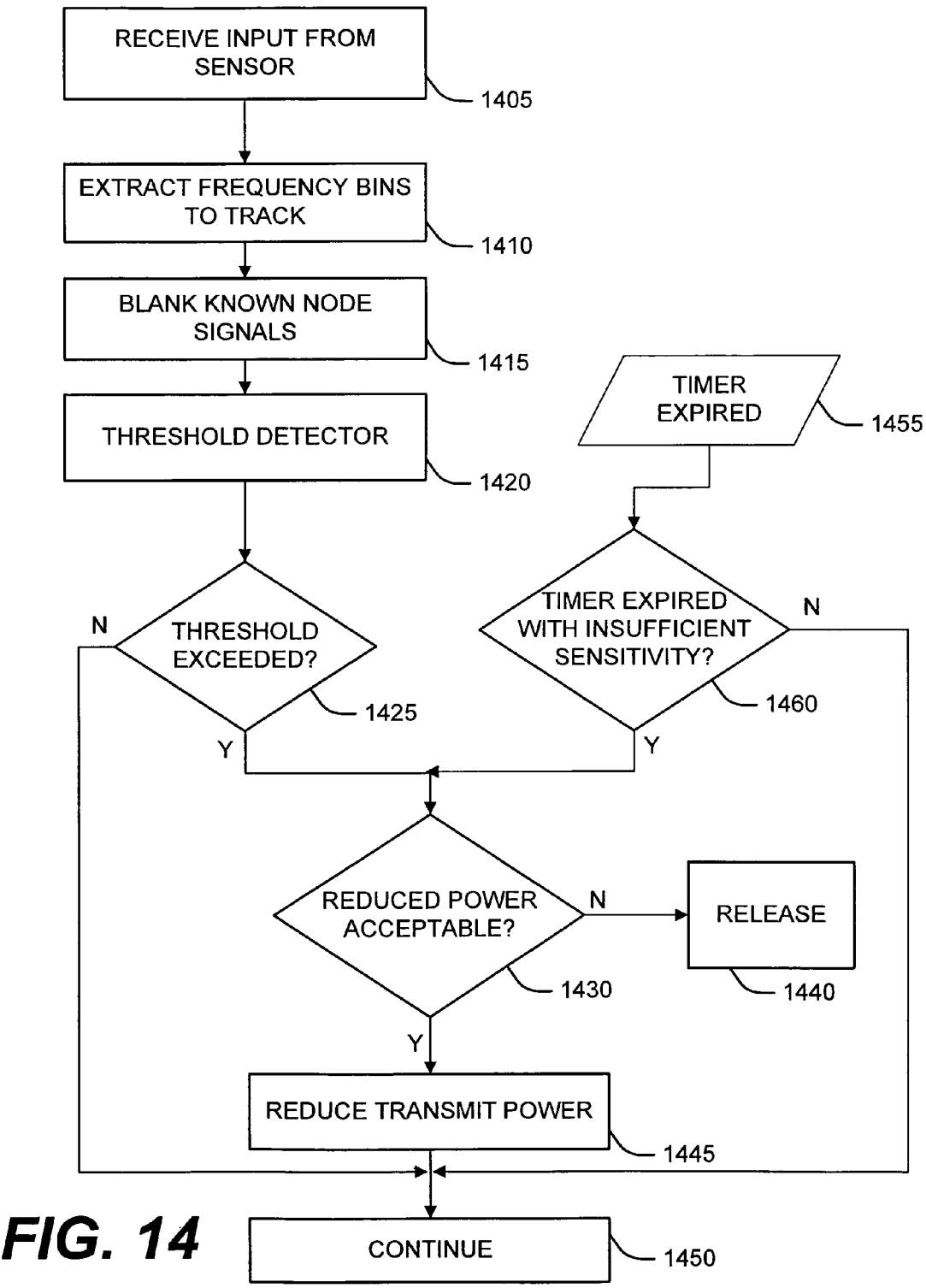
FIG. 14 is a flowchart illustrating one embodiment of a channel release tracking system.

FIG. 14 is a flowchart illustrating one embodiment of the operation of the release processing logic 134. In general, the release processing logic 134 monitors frequencies of bearers used by the node 100 to detect other users of one or more of the one or more frequencies used by the bearer. If another user of one or more bearer frequencies is detected, the release processing logic may take action based on the detected use of the frequency by another user.

The release processing logic 134 receives one or more inputs from the one or more sensors 106 in step 1405. The release processing logic 134 extracts usage for frequency bins that the release processing logic 134 is tracking in step 1410. The release processing logic 134 may receive information from other portions of the sensor 100 to determine which frequency bins to track. In certain example embodiments, the one or more frequencies of bearers utilized in communications with one-hop neighbors may be tracked.

In step 1415, the release processing logic 134 may blank known node signals from the sensed signals. The release processing logic 134 may use information from the neighbor data 138 or other portions of the sensor 100 to determine signals from neighbor nodes to use in the blanking step.

The release processing logic 134 may then use a threshold detector in step 1420 to determine if signals in the frequency bins exceed a threshold. In certain implementations, the threshold may be static or dynamic. For example, the threshold may be based on information from one or more policy awareness data 126, one or more spectrum awareness data 130, one or more neighbor data 138, other data, or any combination of the preceding. If the sensed signal exceeds the threshold (step 1425), the release processing logic 134 may determine in block 1430 if reducing power in the frequency bin is acceptable. If reducing power in the frequency bin is not acceptable (step 1430), the release processing logic 134 may then release the frequency in step 1440. Releasing the frequency may include sending a bearer release message identifying the frequency bin to release. If, however, reducing power is acceptable (step 1430), the release processing logic 134 may reduce the transmit power of the node 100 in that frequency bin in step 1445 and continue in step 1450. If the sensed signal in the frequency bin does not exceed the threshold, the release processing logic 134 continues in block 1450.

In certain example implementations, the release processing logic 134 may determine if altering the waveform of the bearer to avoid interference is feasible. If so, the node 100 may send a message to neighboring nodes to signal such a modification to the waveform of the signal. The node 100 may further alter the waveform of the bearer to avoid interference.

The release processing logic 134 may be associated with a timer to control the time for sensing with the one or more sensors 106. If the release processing logic receives a signal indicating that the timer has expired in step 1455, the release processing logic 134 may determine if the timer expired without sufficient sensitivity to one or more frequency bins. If so, the release processing logic 134 may proceed to step 1430, discussed above. This expiration of the timer with insufficient sensitivity of the sensors 106 may be caused by the node 100 being temporarily overwhelmed by other signals. Otherwise, release processing logic may proceed to step 1450 and continue.

Figure 15:
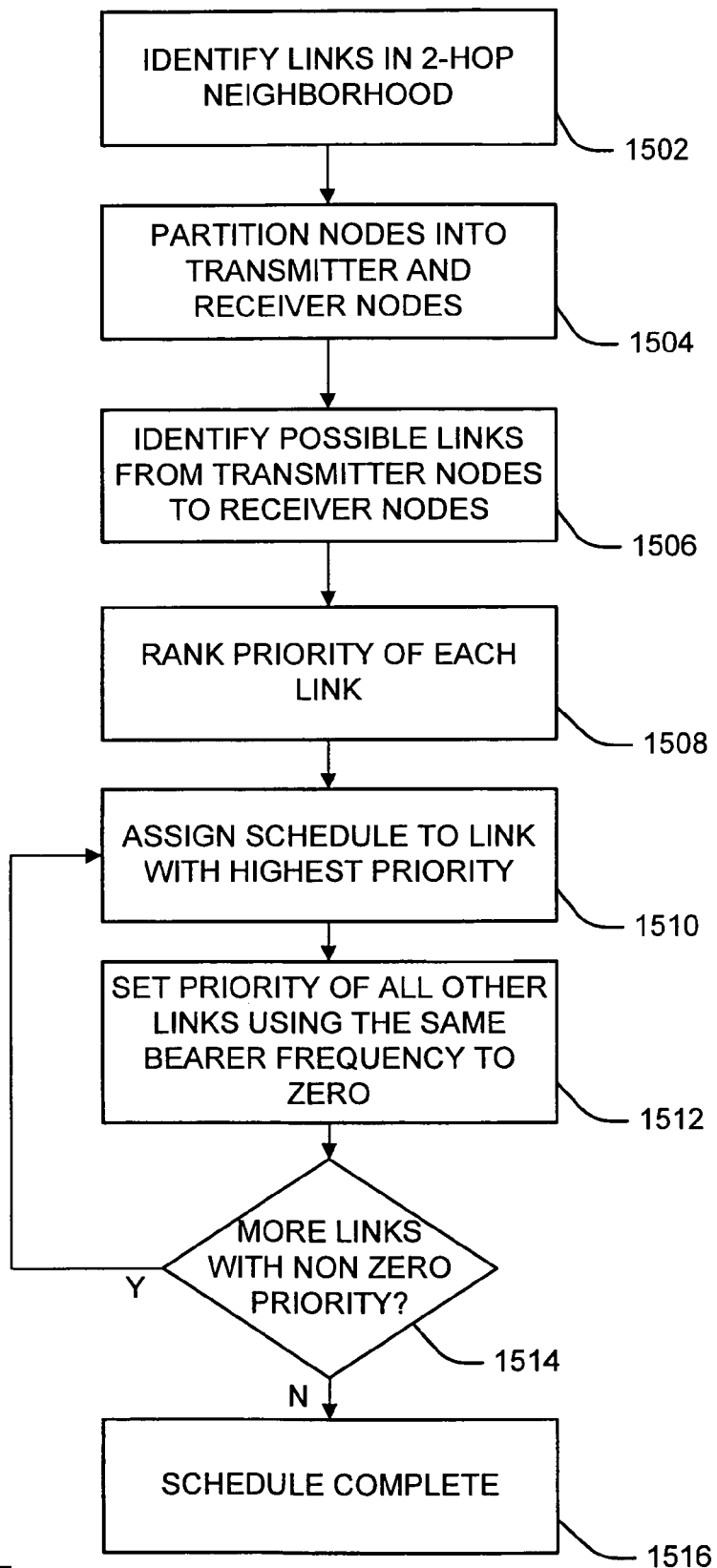
FIG. 15 is a flowchart illustrating one embodiment of a scheduling system.

FIG. 15 is a flowchart illustrating one embodiment of a scheduling procedure performed by scheduler 140. The scheduler 140 begins in step 1502 by identifying all links between nodes in node 100's 2-hop neighborhood. In general, a link is characterized by a pair of nodes and an associated bearer frequency used by the pair of nodes to communicate. In other implementations, the scheduler 140 may consider nodes in a larger or smaller neighborhood. The scheduler 140 then partitions nodes into transmitter and receiver nodes in step 1504. In certain implementations, the partitioning may be performed using a random hashing function. The scheduler 140 then, in step 1506, identifies all possible links from between nodes designated as transmitters in step 1504 to nodes designated as receivers in step 1504.

In step 1508, the scheduler 140 ranks the priority of each of the links identified in step 1506. In certain embodiments, this ranking may be performed using a random hashing function. In step 1510, the scheduler 140 assigns the schedule to the link with the highest priority. The scheduler 140 then sets the priority of all other links using the same bearer frequency as the highest ranked link to zero in step 1512. In step 1514, if there are further links with non-zero priorities, the scheduler 160 returns to step 1510, otherwise the schedule for the time slot is complete. Steps 1502-1516 are repeated for each time slot to be scheduled.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for establishing communications between a plurality of nodes, comprising:
   determining a set of frequencies used to search for neighbor nodes, said determining further comprising:
      providing a key;
      generating a list of possible frequencies;
      using the key, seeding a hashing function; and
      using the hashing function, ordering the list of possible frequencies,
      wherein each of the plurality of nodes determines the set of frequencies autonomously based at least in part on spectrum awareness data; and
   performing an adaptive control channel initialization operation using at least one frequency from the set of frequencies to detect one or more neighbor nodes and when the one or more neighbor nodes are detected, establishing an adaptive control channel with the one or more of the detected neighbor nodes.

2. The method of claim 1, further comprising: altering the list of possible frequencies based at least in part on the spectrum awareness data.

3. The method of claim 1, where seeding the hashing function comprises:
   determining a geographical location of a node; and
   determining the set of frequencies used to search for the one or more neighbor nodes based at least in part on the geographical location of the node.

4. The method of claim 1, where one or more nodes are members of one or more groups, each group identified by a group ID, and where seeding the hashing function comprises: seeding the hashing function based at least in part on a group ID of the node.

5. The method of claim 1, where seeding the hashing function comprises: seeding the hashing function based at least in part on a time.

6. The method of claim 1, where determining the set of frequencies to search for neighbor nodes comprises: determining a Logical Rendezvous Channel, the Logical Rendezvous Channel defined by an ordered list of possible frequencies each corresponding to at least one time slot.

7. The method of claim 1, where performing an adaptive control channel initialization operation to detect one or more neighbor nodes comprises:
   transmitting an adaptive control channel initialization message, the adaptive control channel initialization message identifying at least one selected bearer;
   receiving an acknowledgement message from at least one neighbor node; and
   using the at least one selected bearer to communicate with the at least one neighbor node.

8. The method of claim 1, where performing the adaptive control channel initialization operation further comprises:
   for each time period:
      tuning to a next frequency in the ordered list of possible frequencies;
      determining whether to transmit during the time period, and if so, transmitting an adaptive control channel initialization message on the next center frequency, the adaptive control channel initialization message identifying at least one selected bearer;
   receiving an acknowledgement message from at least one neighbor node in the one or more of the detected neighbor nodes; and
   using the at least one selected bearer to communicate with the one or more neighbor nodes.

9. The method of claim 1, where performing the adaptive control channel initialization operation further comprises:
   for each time period:
      tuning to a next frequency in the ordered list of possible frequencies;
      receiving an adaptive control channel initialization message from at least one neighbor node in the one or more of the detected neighbor nodes on the next center frequency, the adaptive control channel initialization message identifying at least one selected bearer;
      determining whether to transmit during a time period in said each time period, and if so, transmitting an acknowledgement message to the one or more neighbor nodes; and
   using the at least one selected bearer to communicate with the one or more neighbor nodes.

10. The method of claim 1, the method further comprising:
   determining at least one change in the spectrum awareness data; and
   altering the adaptive control channel based at least in part on the at least one change in the spectrum awareness data.

11. A wireless node configured to communicate with one or more other wireless nodes, comprising:
   an interface configured to send and receive signals; and
   one or more processors, where one or more of the one or more processors are configured to:
      determine a set of frequencies used to search for a plurality of neighbor nodes, wherein each of the plurality of nodes determines the set of frequencies autonomously based at least in part on spectrum awareness data;

provide a key;
generate a list of possible frequencies;
using the key, seed a hashing function; and
using the hashing function, order the list of possible frequencies, and
perform an adaptive control channel initialization operation using at least one frequency from the set of frequencies to detect one or more neighbor nodes and when the one or more neighbor nodes are detected, establish an adaptive control channel with the one or more of the detected neighbor nodes.

12. the wireless node of claim 11, where the one or more processors are further configured to: alter the list of possible frequencies based at least in part on the spectrum awareness data.

13. The wireless node of claim 11, where when seeding the hashing function, the one or more processors are further configured to:
determine a geographical location of a node in the plurality of nodes; and
determine the set of frequencies used to search for the one or more neighbor nodes based at least in part on the geographical location of the node.

14. The wireless node of claim 11, where the one or more of the detected nodes nodes are members of one or more groups, each group identified by a group ID, and where when seeding the hashing function the one or more processors are further configured to: seed the hashing function based at least in part on a group ID of the node.

15. The wireless node of claim 11, where when seeding the hashing function, the one or more processors are further configured to: seed the hashing function based at least in part on a time.

16. The wireless node of claim 11, where when determining the set of frequencies to search for neighbor nodes the one or more processors are further configured to:
determine a Logical Rendezvous Channel, the Logical Rendezvous Channel defined by an ordered list of the possible frequencies each corresponding to at least one time slot.

17. The wireless node of claim 11, where the one or, more processors are further configured to:
determine at least one change in the spectrum awareness data; and
alter the adaptive control channel based at least in part on the at least one change in the spectrum awareness data.

18. A system for establishing communications between a plurality of nodes, comprising:
means for determining a set of frequencies used to search for neighbor nodes, said means comprising:
providing a key;
generating a list of possible frequencies;
using the key, seeding a hashing function; and
using the hashing function, ordering the list of possible frequencies,
wherein each of the plurality of nodes determines the set of frequencies autonomously based at least in part on spectrum awareness data; and
means for performing an adaptive control channel initialization operation using at least one frequency from the set of frequencies to detect one or more neighbor nodes and when the one or more nodes are detected, establishing an adaptive control channel with the one or more of detected nodes.

\* \* \* \* \*

UNITED STATES PATENT AND TRADEMARK OFFICE
CERTIFICATE OF CORRECTION

PATENT NO. : 7,787,426 B2 Page 1 of 1
APPLICATION NO. : 11/595740
DATED : August 31, 2010
INVENTOR(S) : Scott Y. Seidel, Jay N. Livingston and Michael R. Franceschini It is certified that error appears in the above-identified patent and that said Letters Patent is hereby corrected as shown below:

Column 16, line 31, "detected nodes." should read -- detected neighbor nodes. --

Signed and Sealed this

Sixteenth Day of November, 2010

David J. Kappos
*Director of the United States Patent and Trademark Office*